United States Patent
Syed

(10) Patent No.: US 7,721,337 B2
(45) Date of Patent: May 18, 2010

(54) SYSTEM AND METHOD FOR PROVIDING A PUSH OF BACKGROUND DATA

(75) Inventor: Majid Syed, Princeton, NJ (US)

(73) Assignee: iBiquity Digital Corporation, Columbia, MD (US)

( * ) Notice: Subject to any disclaimer, the term of this patent is extended or adjusted under 35 U.S.C. 154(b) by 1327 days.

(21) Appl. No.: 10/032,951

(22) Filed: Oct. 26, 2001

(65) Prior Publication Data

US 2003/0093476 A1    May 15, 2003

(51) Int. Cl.
    *G06F 7/04*   (2006.01)
    *G06F 15/16*  (2006.01)
(52) U.S. Cl. .............................. 726/26; 726/27; 709/232
(58) Field of Classification Search ......... 709/230–232; 455/3.01–3.06; 725/95, 97; 726/26, 27
    See application file for complete search history.

(56) References Cited

U.S. PATENT DOCUMENTS

| | | | |
|---|---|---|---|
| 4,025,851 A | | 5/1977 | Haselwood et al. |
| 4,720,873 A | | 1/1988 | Goodman et al. |
| 5,182,640 A | | 1/1993 | Takano |
| 5,440,334 A | * | 8/1995 | Walters et al. ................. 725/92 |
| 5,615,249 A | | 3/1997 | Solondz |
| 5,619,247 A | * | 4/1997 | Russo ........................ 725/104 |
| 5,686,954 A | | 11/1997 | Yoshinobu et al. |
| 5,761,485 A | * | 6/1998 | Munyan ..................... 715/839 |
| 5,778,187 A | * | 7/1998 | Monteiro et al. ............ 709/231 |
| 5,815,671 A | | 9/1998 | Morrison |
| 5,852,630 A | | 12/1998 | Langberg et al. |
| 5,862,325 A | | 1/1999 | Reed et al. |
| 5,886,995 A | | 3/1999 | Arsenault et al. |
| 5,935,218 A | | 8/1999 | Beyda et al. |
| 5,978,381 A | * | 11/1999 | Perlman et al. ............. 370/432 |

(Continued)

FOREIGN PATENT DOCUMENTS

CA    2308821    11/2000

(Continued)

OTHER PUBLICATIONS

Personal Radio System, Command Audio Corporation, 2001.

*Primary Examiner*—Aaron Strange
(74) *Attorney, Agent, or Firm*—Jones Day

(57) ABSTRACT

Digital pre-downloading of high bandwidth digital data is performed through a system gateway based on selective filtering, scheduling, and end user device requirements. Digital broadcasting systems are used to push large bandwidth data during non-peak periods (e.g., in the early AM hours) or during times of other relative network or end user device inactivity. Digital data, such as background images, song compilations, artist compilations, newspapers, e-books, digital purchases of other data, maps of local areas based on, for example, GPS based location detection, etc., are pre-downloaded and stored in the end user (client) device, e.g., a car digital radio or other consumer electronic device with display flag turned off. The device is subscriber preconfigured to selectively filter and retain (e.g., in local cache memory) a desired portion of the data broadcast. Later, a command is sent to activate the contents for subscriber presentation. Delta updates, if received, are pushed in real-time. Real-time updates are matched to the corresponding pre-downloaded data at specific scheduled times. The updates predominantly comprise a refresh of only the changes (delta) to the data (e.g., traffic updates).

56 Claims, 11 Drawing Sheets

U.S. PATENT DOCUMENTS

| | | | |
|---|---|---|---|
| 5,987,518 A | 11/1999 | Gotwald | |
| 6,006,265 A | 12/1999 | Rangan | |
| 6,021,433 A | 2/2000 | Payne et al. | |
| 6,055,566 A | 4/2000 | Kikinis | |
| 6,128,334 A | 10/2000 | Dapper et al. | |
| 6,173,271 B1 | 1/2001 | Goodman et al. | |
| 6,246,672 B1 | 6/2001 | Lumesky | |
| 6,246,698 B1 | 6/2001 | Kumar | |
| 6,253,237 B1 | 6/2001 | Story et al. | |
| 6,256,671 B1 | 7/2001 | Strentzsch et al. | |
| 6,266,774 B1 * | 7/2001 | Sampath et al. | 726/24 |
| 6,374,177 B1 | 4/2002 | Lee et al. | |
| 6,473,858 B1 * | 10/2002 | Shimomura et al. | 713/150 |
| 6,490,432 B1 | 12/2002 | Wegener et al. | |
| 6,526,580 B2 * | 2/2003 | Shimomura et al. | 725/63 |
| 6,529,949 B1 * | 3/2003 | Getsin et al. | 709/217 |
| 6,567,660 B1 | 5/2003 | Wegener | |
| 6,608,994 B1 | 8/2003 | Wegener et al. | |
| 6,609,097 B2 | 8/2003 | Costello et al. | |
| 6,622,007 B2 | 9/2003 | Linden | |
| 6,721,337 B1 | 4/2004 | Kroeger et al. | |
| 6,745,237 B1 | 6/2004 | Garrity et al. | |
| 6,754,894 B1 | 6/2004 | Costello et al. | |
| 6,782,510 B1 | 8/2004 | Gross et al. | |
| 6,822,954 B2 | 11/2004 | McConnell et al. | |
| 6,826,396 B1 | 11/2004 | Yasue et al. | |
| 6,829,475 B1 | 12/2004 | Lee et al. | |
| 6,876,835 B1 | 4/2005 | Marko et al. | |
| 6,879,808 B1 | 4/2005 | Nations et al. | |
| 6,907,247 B2 | 6/2005 | Thompson et al. | |
| 6,957,041 B2 | 10/2005 | Christensen et al. | |
| 6,959,436 B2 | 10/2005 | Peng | |
| 7,046,691 B1 | 5/2006 | Kadyk et al. | |
| 7,061,482 B2 | 6/2006 | Ferris | |
| 7,065,058 B1 | 6/2006 | Korus | |
| 7,171,174 B2 | 1/2007 | Ellis et al. | |
| 2001/0042146 A1 | 11/2001 | Bolleman et al. | |
| 2002/0010641 A1 | 1/2002 | Stevens et al. | |
| 2002/0016820 A1 | 2/2002 | DuVal et al. | |
| 2002/0044567 A1 | 4/2002 | Voit et al. | |
| 2002/0049717 A1 | 4/2002 | Routtenberg et al. | |
| 2002/0068539 A1 | 6/2002 | Hitomi et al. | |
| 2002/0095228 A1 * | 7/2002 | Corts et al. | 700/94 |
| 2002/0142763 A1 | 10/2002 | Kolsky | |
| 2002/0146016 A1 | 10/2002 | Liu et al. | |
| 2002/0156761 A1 | 10/2002 | Chen et al. | |
| 2002/0174269 A1 | 11/2002 | Spurgat et al. | |
| 2002/0198963 A1 * | 12/2002 | Wu et al. | 709/219 |
| 2003/0009765 A1 | 1/2003 | Linden et al. | |
| 2003/0014483 A1 | 1/2003 | Stevenson et al. | |
| 2003/0046670 A1 | 3/2003 | Marlow | |
| 2003/0055977 A1 | 3/2003 | Miller | |
| 2003/0083977 A1 | 5/2003 | Syed | |
| 2003/0084108 A1 | 5/2003 | Syed | |
| 2003/0093530 A1 | 5/2003 | Syed | |
| 2003/0140172 A1 | 7/2003 | Woods et al. | |
| 2003/0177142 A1 * | 9/2003 | Ferris | 707/104.1 |
| 2004/0194131 A1 | 9/2004 | Ellis et al. | |
| 2006/0069718 A1 | 3/2006 | Hirayama | |
| 2006/0073810 A1 | 4/2006 | Pyhalammi et al. | |

FOREIGN PATENT DOCUMENTS

| | | |
|---|---|---|
| EP | 1 037 419 | 3/2000 |
| TW | 386201 A1 | 4/2000 |
| WO | WO 00/74322 | 12/2000 |
| WO | WO 01/55912 | 8/2001 |
| WO | WO 02/11324 | 2/2002 |
| WO | WO 03/021416 | 3/2003 |

* cited by examiner

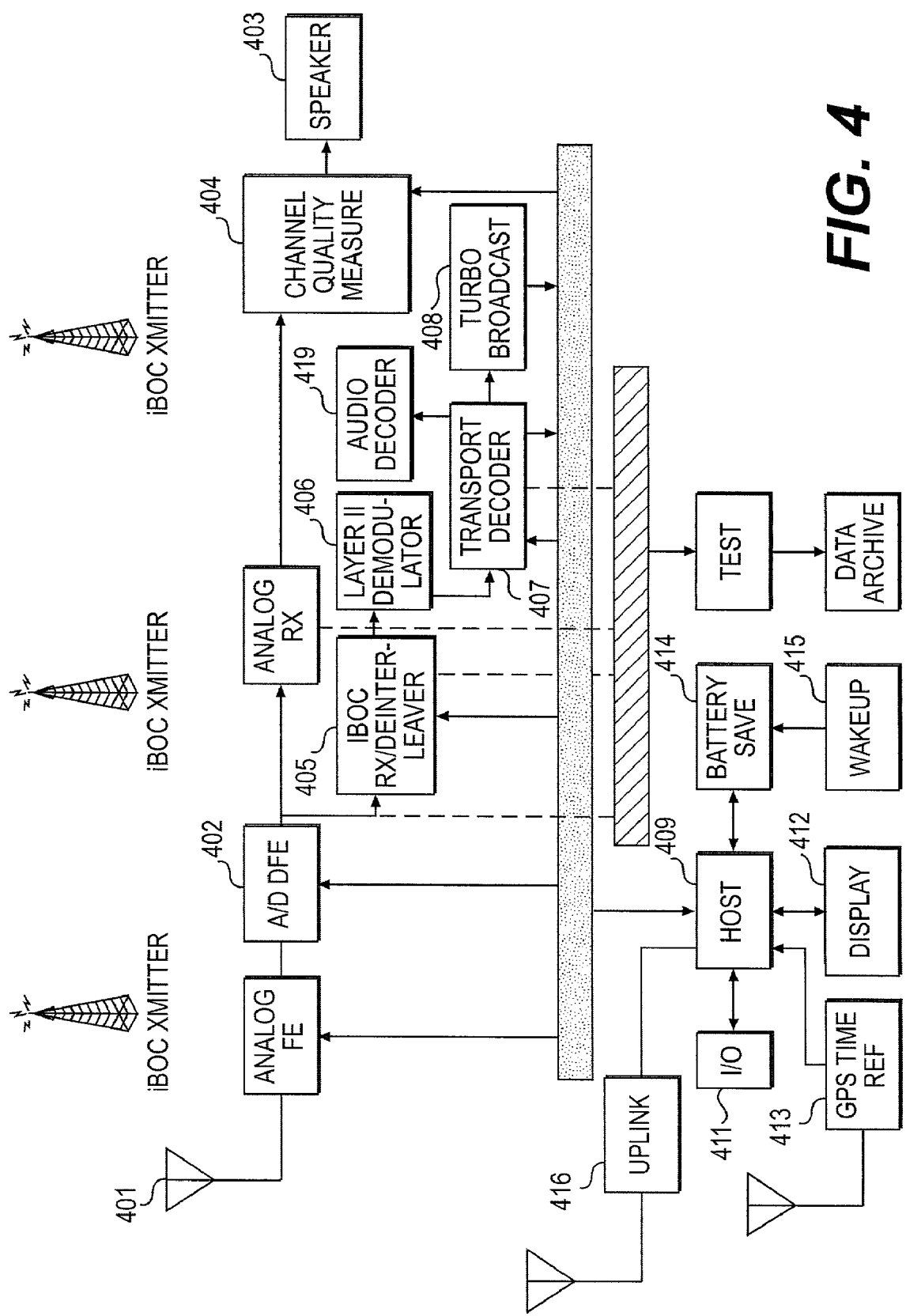

| MESSAGE NAME | ASP | iPPG | Rx | DESCRIPTION |
| --- | --- | --- | --- | --- |
| ORIGINATING ADD | X | X | X | SERVICE OPERATOR CODE (SOC) OR ADDRESS |
| DESTINATION ADD | X | | X | BROADCAST, MULTICAST OR UNICAST |
| MESSAGE REF. | X | X | | RANDOM #0- 16 BITS LONG |
| SERVICE CLASS | X | X | | BASIC, PREFERRED, PREMIUM, ETC. |
| PRIORITY INDICATOR | X | X | X | NORMAL, URGENT, EMERGENCY |
| SERVICE CATEGORY | | X | X | UNKNOWN/UNSPECIFIED, ADMINISTRATIVE, MAINTENANCE, TALENT ANNOUNCEMENT, ADVERTISEMENT, NEWS (LOCAL, REGIONAL, NATIONAL, INTERNATIONAL), SPORTS, WEATHER, TRAFFIC, EMERGENCY, ALERT, STOCKS (LOCAL, REGIONAL, NATIONAL, INTERNATIONAL), ENTERTAINMENT, RESTAURANTS, LODGING, ADVERTISEMENTS, MEDICAL, HEALTH, HOSPITALS, MULTIMEDIA, AUDIO, LOGO, TEXT, ETC. |
| ALERT | | | X | WITH INFO VIBRATE, TONE, REMIND, CADENCE, ETC. |
| LANGUAGE ID | X | | X | LANGUAGE FILTRATION |
| PERIODICITY | X | | | REPETITION RATE |
| VALIDITY | X | X | | INDEFINITE, POWER DOWN, DISPLAY ONLY, ETC. |
| VALIDITY ABSOLUTE | X | X | | VALIDITY PERIOD (MESSAGE VALID DURING THESE TIMES) |
| VALIDITY PERIOD | X | X | | MESSAGE VALID/NOT VALID DURING THESE TIMES |
| MESSAGE TIME STAMP | | X | X | OPTIONAL |
| ZONE | X | X | | CELLS, SECTORS, ENTIRE, ETC. |
| BEARER DATA | X | X | X | ANY DESIRED MESSAGE CONTENTS |
| CONTACT # | X | | X | FOR POINT OF SALE INFORMATION. MAY BE A HYPERLINK. |
| SECURITY | | X | X | |
| PRIVACY INDICATOR | | X | X | UNRESTRICTED, RESTRICTED, CONFIDENTIAL, SECRET |
| FEATURE PRIVATE | X | | X | |
| DISPLAY EXECUTION | | X | X | PRE DOWNLOAD WITH DEACTIVATE ON/OFF WITH KEY/WITHOUT KEY |
| TBD | | | | TO BE DETERMINED |

TABLE 1

FIG. 6

SYSTEM AND METHOD FOR PROVIDING A PUSH OF BACKGROUND DATA

RELATED APPLICATIONS

This application is related to commonly assigned and co-pending applications entitled "System and Method for Providing a Push Gateway between Consumer devices and Remote Content Provider Centers" and "System and Method for Push/Pull Gateway Directed Digital Receiver".

FIELD OF INVENTION

The present invention relates generally to the field of digital broadcasting. More specifically, the present invention is related to using communication gateways to pre-download end user devices with digital data, (audio or raw data).

BACKGROUND OF INVENTION

Definitions have been provided to help with a general understanding of network transmissions and are not meant to limit their interpretation or use thereof. Thus, one skilled in the art may substitute other known definitions or equivalents without departing from the scope of the present invention.

Datagram: A portion of a message transmitted over a packet-switching network. One key feature of a packet is that it contains the destination address in addition to the data. In IP networks, packets are often called datagrams.

PUSH: In client/server applications, to send data to a client without the client requesting it. The World Wide Web (WWW) is based on a pull technology where the client browser must request a Web page before it is sent. Broadcast media, on the other hand, utilize push technologies because information is sent out regardless of whether anyone is tuned in.

Increasingly, companies are using the Internet to deliver information push-style. One example of a widely used push technology is e-mail. This is a push technology because you receive mail whether you ask for it or not—that is, the sender pushes the message to the receiver.

PULL: To request data from another program or computer. The opposite of pull is push, where data is sent when a request is being made. The terms push and pull are used frequently to describe data sent over the Internet. As mentioned earlier, the WWW is based on pull technologies, where a page isn't delivered until a browser requests it. Increasingly, however, information services are harnessing the Internet to broadcast information using push technologies. A prime example is the PointCast Network™.

RADIO BROADCASTING: Airborne transmission of audio signals via electromagnetic carrier waves accessible by a wide population by means of standard receivers, such as radios. Radio waves are not only deployed as a carrier in standard radio broadcasting, but also in wireless telegraphy, telephone transmission, television, navigation systems, and radar. Radio waves are of different length and usually identified by their frequency, i.e., the number of times per second that a periodic wave repeats. The shortest waves have the highest frequency, and the longest waves have the lowest frequency. A typical radio communication system features the following two main components: a transmitter and a receiver. The transmitter generates electrical oscillations at a radio frequency called the carrier frequency. In analog radio broadcasting, either the amplitude (AM) or the frequency (FM) itself may be modulated to vary the carrier wave, thereby producing sounds. At the receiver device, the antenna converts the incoming electromagnetic waves into electrical oscillations, which are then increased in intensity by amplifiers. Finally, a speaker in the receiving device converts the electrical impulses into sound waves audible to the human ear. Several types of noise such as static—caused by electrical disturbances in the atmosphere, hum—a steady low-frequency note commonly produced by the frequency of the alternating-current power supply, hiss—a steady high frequency note, or a whistle—a pure high-frequency note produced by unintentional audio-frequency oscillation, cause broadcast interference and distortion at the receiver end.

Currently, approximately 10,000 radio stations are located throughout the U.S.A., reaching a vast audience. U.S. radio stations are operating with analog technology and are almost evenly divided between two broadcast spectrums: amplitude modulation (AM) at 0.525-1.705 MHz and frequency modulation (FM) at 88-108 MHz. A new emerging technology known as in-band on-channel (IBOC) allows these radio stations to deploy digital transmission technology within existing bandwidths allocated to the AM and FM stations. Digital transmission allows data processing in strings of 0's and 1's, rather than analog transmission by means of electronic signals of varying frequency or amplitude that are added to carrier wave of a given frequency. Digital technology is primarily deployed in new communication media, such as computers and fiber-optic networks. By way of example, a modem is used to: modulate outgoing digital signals from a computer to analog signals for a conventional copper twisted pair telephone line, to demodulate the incoming analog signal, and to convert it to a digital signal for the computer in order to facilitate communication via the Internet.

The Internet is an international system of computer networks, comprised of a series of computers interconnected by means of data lines, routers, and/or wireless communication links. Each computer, as a part of the Internet, serves, amongst other things, as a storage device for data flowing between computers. The Internet facilitates data interchange, as well as remote login, electronic mail, and newsgroups. One integral part of the Internet is the World Wide Web (hereafter "the Web" or WWW), a computer-based network of information resources. The Internet is also a transmission medium for e-mails, short messages (SMS) or other data content.

Like traditional computer networks, the Internet operates within the client-server format. Servers are typically remote computer systems that store and transmit electronic documents over the network to other computers upon request. Clients, on the other hand, are computer systems or other interactive devices that request/receive the stored information from a server. A client may be a personal computer or a wireless device such as a handheld, a cellular phone or other Internet-enabled mobile device that is capable of two-way communication.

In the traditional client-server model, a client requests a service or data from a server, which then responds by transmitting the data to the client. As mentioned earlier, this is known as "pull" technology because the client "pulls" data from the server. The Web is a typical example of Pull technology wherein a user sends a data request by entering a Uniform Resource Locator (URL) to a server which then answers by sending the Web site at the requested URL back to the user. In contrast, "push" technology, which also operates within the client-server model, does not require a user initiated data request prior to the transmission of data. Such data transmissions are common in the so-called Web Casting technology, i.e., the prearranged updating of news, weather, or other selected information on the interface of a device with digital capabilities through periodic and generally unobtrusive transmission. Currently, Web Casting technology primarily targets computer users. Yet, as described above, there is a huge audience in the radio broadcast area, and there exists a strong demand for data casting content such as: song titles, artist names, lyrics, traffic and weather news, stock market quotes, pager messages or complementary product information. New radio receivers with Liquid Crystal Displays (LCD) combined with the deployment of the inbound on-channel (IBOC) technology facilitate such data casting.

As known in the art, network communication is based on the seven layer model Open System Interconnection (OSI). Information being transferred from a software application in one communication system to another, e.g., from one computer to another via the Internet, must pass through each of the OSI layers. Each layer has a different task in the information exchange process and the actual information exchange occurs between peer OSI layers. Each layer in the source system adds control information to the transmission data and each layer in the destination system analyzes and removes the control information from that data. At the lowest layer, the physical layer, the entire information packet is placed onto the network medium where it is picked up by the receiving unit. In this model, protocols represent and describe the formal rules and conventions that govern the exchange of information over a network medium. The protocol likewise implements the functions of one or more of the OSI layers. For example, the transport protocol for Web sites is the Hyper Text Transfer Protocol (HTTP), for e-mails Simple Mail Transfer Protocol (SMTP) and for software programs File Transfer Protocol (FTP). Premised in the functions of the used network layers to be implemented and the tasks to be achieved during the communication, protocols vary in their specifications. Many additional protocols exist to assist in standardizing communication standards.

Web sites are formatted in Hyper Text Markup Language (HTML), Wireless Markup Language (WML), or Extensible Markup Language (XML). These are standard text formatting languages for interconnected networks such as the Internet. So-called Web browsing software interprets HTML, WML, and/or XML documents, thereby allowing users to view Web sites on their display screen. As in the case with protocols, additional languages exist for the marking-up of Web sites or other data.

The data link between the Internet and a wireless device is established via a wireless modem or an antenna and a wireless carrier service using radio frequencies, rather than via twisted-pair or fiber-optic cables. Content for wireless services is marked up in Wireless Application Protocol (WAP), rather than HTTP. For that reason, Internet servers cannot directly communicate with, and content cannot be directly sent to wireless devices.

Multimedia content for wireless services place a unique burden on the specific communications system from which it is transmitted. Specific bandwidth requirements for multimedia far exceed those required by typical prior art audio only broadcast radio. In addition, the inclusion of high bandwidth data in a normal broadcast stream significantly slows the data flow to the end user. The prior art has failed to implement a broadcast system that efficiently and effectively transmits data content to include large bandwidth data through a radio broadcast system.

Prior art solutions to overcoming some of the problems associated with transmitting high bandwidth multimedia content through traditional systems are described briefly below.

U.S. Pat. No. 5,878,223 (Becker et al.) provides for a "System And Method For Predictive Caching Of Information Pages." A computer, e.g. a server or computer operated by a network provider sends one or more requesting computers (clients) a most likely predicted-to-be selected (predicted) page of information by determining a preference factor for this page based on one or more pages that are requested by the client. This page is added to a local cache of predicted-to-be-selected pages in the client.

U.S. Pat. No. 5,732,267 (Smith) provides for "Caching/Prewarming Data Loaded From CD-ROM." Data defining pages and objects of a multimedia work are transferred in the background to minimize delays that would otherwise be incurred. In playing a multimedia work that is recorded on a CD-ROM, a personal computer (10) that includes a central processing unit (CPU) (23) transfers data for selected pages and for objects on a page of the multimedia work into a cache, using free CPU cycles, so that the data are available when needed. This technique is particularly useful in transferring data for animation objects of a multimedia work, since it enables two animations to play concurrently without incurring a delay to load the data for the second animation when the page is loaded and avoids interrupting the execution of the first animation at the time that the second animation must start executing.

U.S. Pat. No. 6,055,569 (O'Brien, et al.) provides for "Accelerating Web Access By Predicting User Action." A smart browser works in conjunction with an HTTP server selectively downloading WWW pages into the browser's memory cache. The determination of which pages to download is a function of a probability weight assigned to each link on a Web page. By evaluating that weight to a predetermined browser criteria, only those pages most probably to be downloaded are stored in the browser's memory cache. The download is done in the background while the browser user is viewing the current Web page on the monitor. This greatly enhances the speed with which the viewer can "cruise" the Web while at the same time conserving system resources by not requiring the system to download all the possible links.

U.S. Pat. No. 5,802,292 (Mogul) provides for a "Method For Predictive Prefetching Of Information Over A Communications Network." A method for predictive prefetching of objects over a computer network includes the steps of providing a client computer system, providing a server computer system, the server computer system having a memory, a network link to the client computer system, the network link also providing connection of the server computer system to the computer network, requesting from the server computer system by the client computer system a retrieval of a plurality of objects, retrieving the plurality of objects by the server system, storing the retrieval and an identity of the client computer system in the memory of the server computer system, sending the plurality of objects from the server computer system to the client computer system over the network link, predicting in the server computer system a plurality of subsequent retrieval requests from the client computer system according to a predetermined criteria, sending the prediction to the client computer system, and prefetching by the client computer system an object based on the prediction and other information. With such an arrangement, an object may be prefetched before a user actually requests it. This makes the retrieval latency appear to be zero when a user requests a prefetched object.

U.S. Pat. No. 5,682,441 (Ligtenberg, et al.) provides for a "Method And Format For Storing And Selectively Retrieving Image Data." A method of processing an input image for storage includes decomposing the input image into a number of images at various resolutions, subdividing at least some of these images into tiles (rectangular arrays) and storing a block (referred to as the "tile block") representing each of the tiles, along with an index that specifies the respective locations of the tile blocks. In specific embodiments, the tiles are 64.times.64 pixels or 128.times.128 pixels. The representations of the tiles are typically compressed versions of the tiles. In a specific embodiment, JPEG compression is used. In a specific embodiment, an operand image is recursively decomposed to produce a reduced image and a set of additional (or complementary) pixel data. At the first stage, the operand image is normally the input image, and for each subsequent stage, the operand image is the reduced image from the previous stage. At each stage, the reduced image is at a characteristic resolution that is lower than the resolution of the operand image. The processing is typically carried out until the resulting reduced image is of a desired small size.

SUMMARY OF THE INVENTION

Digital pre-downloading of high bandwidth digital data is performed through a system gateway based on selective filtering, scheduling, and end user device requirements. Digital broadcasting systems are used to push large bandwidth data during non-peak periods (e.g., in the early AM hours) or during times of other relative network or end user device inactivity. Digital data (deterministic as well as non-deterministic), such as background images, song compilations, artist compilations, digital purchases of other data, maps of local areas based on, for example, GPS based location detection, etc., are pre-downloaded over an IBOC network (such as the IBiquity's proprietary IBOC network or iBOC™) into the end user (client) device, e.g., a consumer device radio. The consumer device radio has unique identifier(s) to selectively filter (selective filter is preconfigured by the listener through OEM provided man machine interface (MMI)) and retain (e.g., in local memory) a desired portion of the data broadcast. During peak times, real-time data content (e.g., updates) are broadcast to the client, matched to the corresponding pre-downloaded data, and activated by gateway or an internal clock together (e.g., overlaying of image and corresponding text) at specific scheduled times. The updates typically comprise a refresh of only the changes (delta) to the data (e.g., text, traffic updates, weather updates, map changes, missing data, new songs, etc.).

The data gateway includes content provider centers or content sponsors to push data or have it pulled from remote networks, and to broadcast it thorough an existing in-band on-channel (IBOC) network to consumer devices such as the car digital radio device (client). The gateway particularly serves as a data concentration and management center with several data processing features for facilitation of data transmission. The employed transmission protocol for data pushes from push initiators to the gateway supports operations such as push authentication and submission, delivery instructions, result notification, and various scheduling features. The employed transmission protocol for data pushes from the gateway to the targeted mobile devices within reach of the IBOC broadcast network supplements the existing network broadcast protocols by enabling continuous broadcast of digitized content without the use of sessions. It supports handling of transmission errors, various addressing schemes, multiple transmission speeds, prioritization of content, and other scheduling features.

In addition, the push-pull gateway is able to schedule the pre-downloads with a deactivate flag, wherein an alert is sent at a later time indicating when to activate the pre-downloaded contents in the client receiver. As such, the system includes a real-time or non-real-time Push. In the preferred embodiment, the real-time push uses ASP simplex communication with the client (via an intermediary iPPG). Non-real-time is a pre-download where the deactivate flag is on with the condition that the receiver is always on.

BRIEF DESCRIPTION OF THE DRAWINGS

FIG. 4 illustrates how incoming data is handled at the client (receiver's end, such as an IBOC-enabled device).

FIG. 6 illustrates a table of Turbo Broadcast Layer messages for pushing data.

DESCRIPTION OF THE PREFERRED EMBODIMENTS

Figure 1:
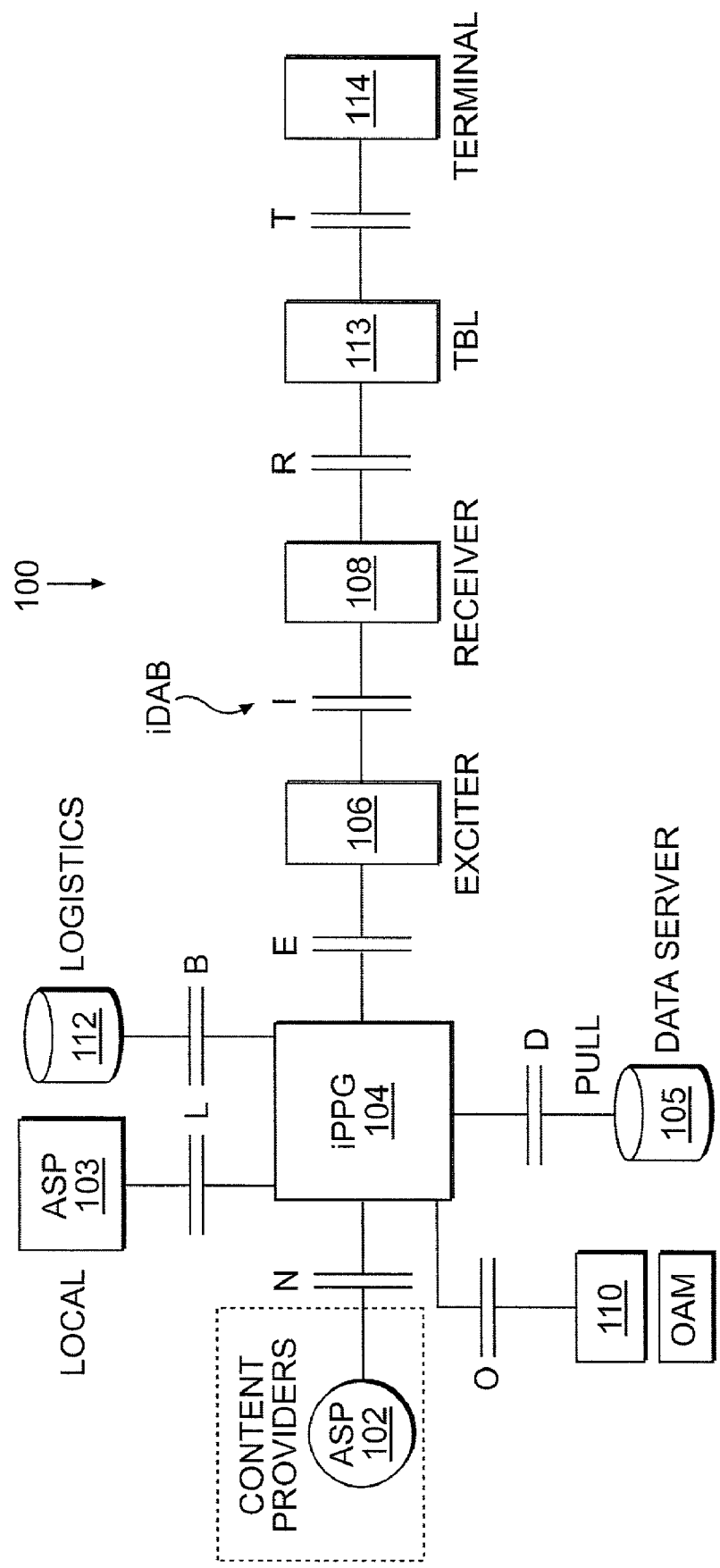
FIG. 1 illustrates the Push-Pull Gateway (hereafter iPPG) End-to-End (E2E) system used to implement the present invention.

While this invention is illustrated and described in a preferred embodiment, the device may be produced in many different configurations, forms and materials. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

FIG. 1 illustrates a Push-Pull Gateway (hereafter iPPG) End-to-End (E2E) system 100 used to implement the present invention. This Push-Pull Gateway system is described in greater detail in co-pending application entitled "System and Method Providing a Push Gateway between Consumer devices and Remote Content Provider Centers". The system components (to be described below) of the iPPG collectively achieve the Push, Pull, and send features of the gateway (iPPG). In FIG. 1, the remote 102 or local 103 application service providers (ASPs) submit (or Push) contents, over a network N (e.g., the Internet) via a protocol such as HTTP, to the iPPG 104. The iPPG 104 is able to either accept or reject such requests by ASPs 102 and 103. The iPPG is also able to retrieve (or Pull) contents from data server 105 as selected by a station operator. The iPPG of the present invention, with the help of an operation administration module (OAM) 110, prioritizes, schedules, and sends datagrams to the radio transmitter station or iExciter (exciter 106) over interface E. Receiver 108 (client) acquires the data and using turbo broadcast layer 113 de-encapsulates the data. The data is then displayed on terminal 114. Furthermore, a billing procedure keeps track of all data pushes (via pre-defined logistics 112) from various ASPs for billing purposes. As will be detailed later, when in listen mode, the data receiver 108 displays the received data continuously, or, upon demand, as per filtration activated by subscriber.

It should be noted that the ASP 102 is able to communicate with iPPG 104 via various access mediums known in the prior art. However, in the preferred embodiment, the access medium is a plain old telephone system (POTS). Furthermore, the ASP 102 is also able to establish a session using transmission control protocol (TCP) over an Internet service provider (ISP) network. It should, however, be noted that although establishing connections between ASP and iPPG via TCP is described, one skilled in the art can envision using other protocols including, but not limited to, the point-to-point protocol (PPP).

Figure 2:
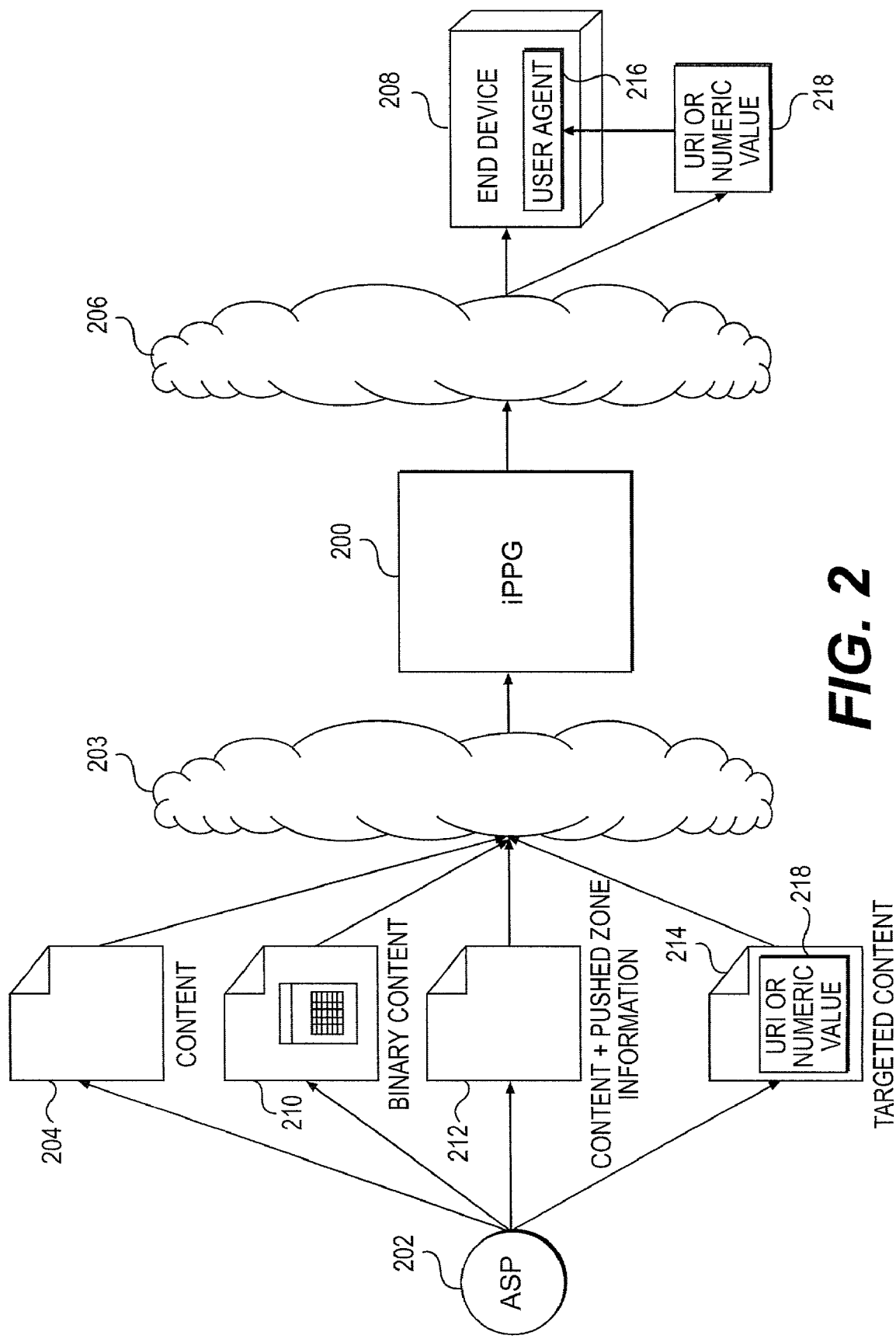
FIG. 2 illustrates handling of various data content by the push-pull gateway (iPPG) used to implement the present invention.

FIG. 2 illustrates handling of various data content by the push-pull gateway (iPPG) used to implement the present invention. ASPs 202 are linked to the iPPG 200 via a network 203. As described earlier, the iPPG 200 is able to push data content 204 (upon request by the ASP 202) on to various end devices 208 linked via a network 206 such as an IBOC network. In one embodiment, the ASP is able to precompile the content to be pushed in binary form 210 to take the workload of the iPPG 200 (or other reasons). Thus, when iPPG receives precompiled content, they are forwarded as received to the end devices. Furthermore, the ASP 202 is also able to request multi-zone coverage which spans to national coverage. In this instance, the ASP submits information 212 regarding the pushed zone(s), time to broadcast, how many times, etc., for each radio transmitter station (iExciter).

In another embodiment, a push initiator is able to target content 214 to a specific user agent 216 in the device 208. To identify this user agent, the application recognizes an identifier 218 associated with a specific user. This identifier 218 is either a URI or a numeric value. The Push initiator provides the application identifier when the Push content is submitted and is eventually transmitted to the client for dispatching the pushed content to an appropriate user agent.

Figure 3:
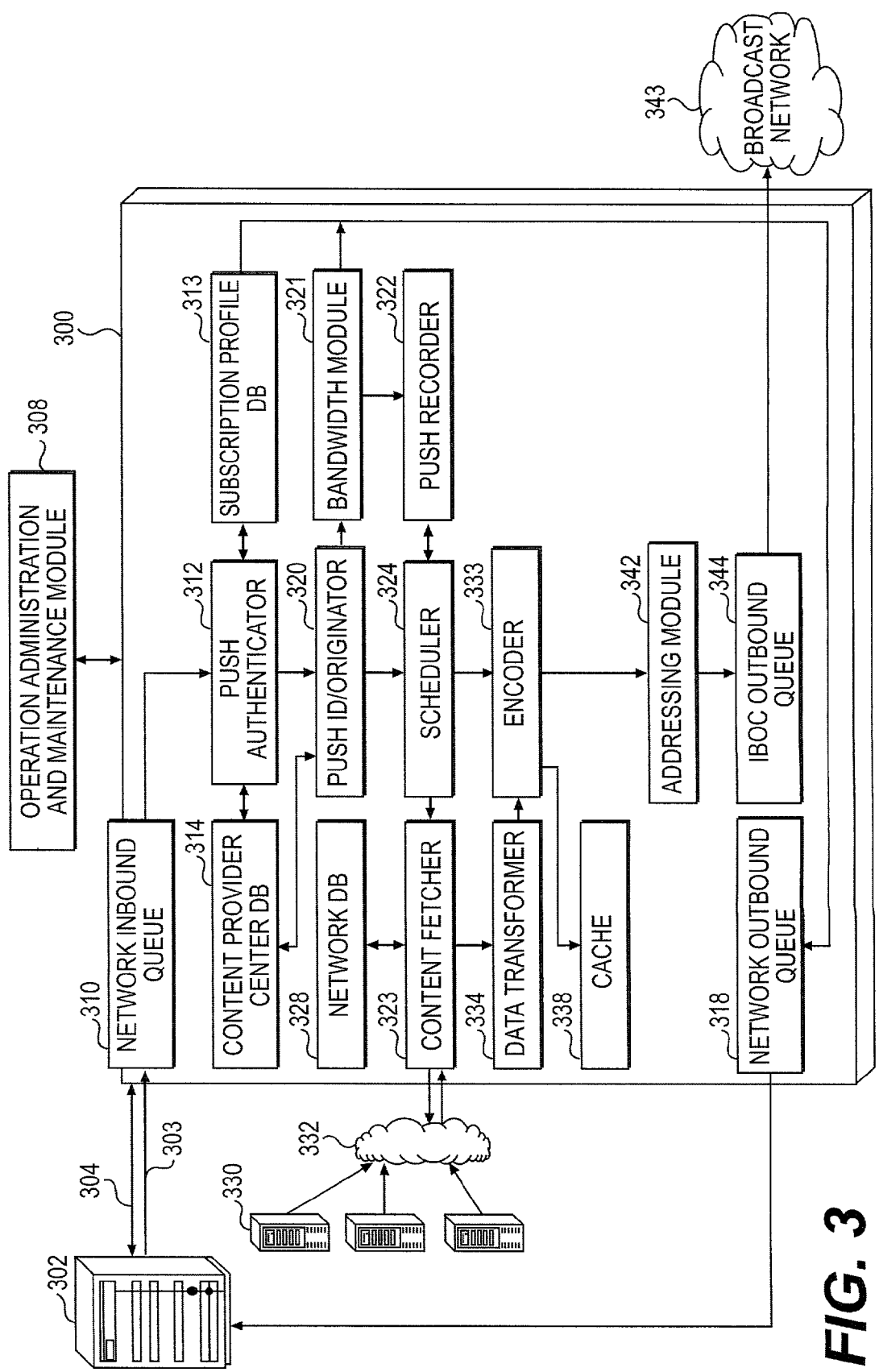
FIG. 3 illustrates, in greater detail, the functionality of the iPPG shown in FIGS. 1 and 2.

FIG. 3 illustrates, in greater detail, the functionality of iPPG 300. The content provider center 302 establishes session 304 with iPPG 300. The established session provides for a data link such as a link based upon a standard peer-2-peer protocol or any other data communication link. Furthermore, as shown, an operation administration and maintenance module (OAM) 308 controls, in an event driven manner, the iPPG 300. Content provider center 302 is able to submit a push request 303 to the iPPG 300, where it is first received by the network inbound queue 310. Next, push authenticator 312 identifies and authenticates content provider center 302 as the push initiator. This authentication is performed based upon information stored in content provider center database 314. In a real-time scheduling scenario, the iPPG is always aware of the over the air bandwidth availability for a defined calendar and is kept in bandwidth module 321. After authentication when iPPG is accessed, the ASP is informed regarding the availability of slots and their associated cost to network outbound queue 318. Furthermore, upon some dialogue interaction, the iPPG is able to accept or reject the contents to be transmitted over the air. Furthermore, the push authenticator 312 checks if the push message contains any client device capabilities queries (a query requesting client's device supported format (e.g., Text, HTML, WML, etc.), and if so, the queries are passed onto OEM device profile database 313, wherein the device profiles of queried OEMs are extracted and passed on to the network outbound queue 318 for transmission to the content provider center 302. On the other hand, if the push message is made up of just data content to be pushed (or a request for data content to be pushed): push ID/originator ID numbers 320 are extracted from the content provider center database 314 and the bandwidth pool is queried for resources, and if bandwidth is available, the extracted numbers are passed onto the push recorder 322 for storage.

A scheduler 324, then parses control entity of the message and determines time/schedule for contained instructions and passes such information for storage on to push recorder 322. If the instruction extracted by the scheduler 324 includes retrieving data, the content fetcher 323, in conjunction with the scheduler 324 and a network database 328, pulls data from content providers 330 via a network 332, such as the Internet. The pulled data is then transformed and encoded (via data transformer 334 and encoder 333, respectively) into a format requested by the client. Furthermore, data transformer 334 and encoder 333 split the data into octet data blocks, assign serial numbers to all packets, and pass them on to addressing module 342 and cache 338. Lastly, the data from the addressing module is passed onto the IBOC outbound queue 344 to various end devices linked to a broadcast network 343, such as an IBOC network.

The iPPG maintains a log of broadcast detail records from the iExciter to the iPPG (e.g., for the purposes of billing). The iPPG also supports 7 and 8 bit data coding schemes for OTA efficiency (local function in iPPG). In one variation, to improve OTA efficiency, a numeric identifier is used instead of a URI (Uniform Resource Identifiers). In this case, a broadcast interim authority assigns numbers to well-known user agents to avoid the overhead of sending a URI. The broadcast interim authority publishes a list of assigned numerical identifiers. If an iPPG requests to Push content with an application address URI that the iPPG recognizes as a URI (which has broadcast interim authority assigned numeric identifier), the URI is replaced with the numeric identifier. In an extended variation, the Push initiator requests a numeric identifier to be used (an identifier that is not registered). It should, however, be noted that special care should be taken to avoid collisions. The iPPG is also involved in reliability, rate at which broadcast of message should be repeated, time at which a message should commence broadcasting, determining pre-download with deactivate flag enabled, and determining when to activate the deactivate flag.

Furthermore, the iPPG initiates transmission by sending fixed-length messages to an iExciter, and when necessary, pads the message with appropriate character to a length of fixed octets. It further maintains flow control when received load indication messages indicate an underflow or overflow situation by the iExciter (provided duplex link). Additionally, in one variation, the iPPG is able to route the contents to selective iPPG (when more than one iPPG exists and are networked). In this embodiment, a centralized gateway: performs intelligent scheduling such that same information is not repeated by each station provided, stations have similar contour coverage), keeps track of available bandwidth, and instructs receivers to look around for other information. Additionally, iPPG determines the neighboring station channel (look around) on which the message should be broadcast. The iPPG further routes broadcast messages to the appropriate iExciters (in the instance that more than one iExciter exists and these iExciters are networked).

The iPPG also determines the time at which a message should cease being broadcast and subsequently instructs each iExciter to cease broadcast of the message. It also determines the set of zones/iExciters to which a message should be broadcast, and indicates within a token number the geographical scope of each message (if networked).

Non-exhaustive messages pertinent for Push are provided in Table 1 illustrated in FIG. 6. These fields are presented as options, which ASPs (102,103) need to select. In the preferred embodiment, these fields are provided in XML/HTML or by HTTP. It should be noted that a broadcast association allocates a service operator code (SOC). Periodicity, in Table 1, refers to the number of times the content is to be transmitted. In the event of a conflict where the iPPG has more than one message to send at the same time, the iPPG decides the order of such messages as a matter of implementation.

An iExciter/Zone identifier field identifies an operator-defined zone. It should, however, be noted that the FCC has already defined these zones. Thus, the iPPG pulls the deterministic information from the FCC database and uses this information for contour verification purposes. The zone field identifies the iExciter to which the message applies. In the preferred embodiment, the zone-list (footprint list) contains at least one iExciter and the iPPG keeps a log of OTA transmissions. The billing management layer or OAM layer uses this information for later use. This periodicity parameter is a list indicating the number of times the message has been sent to each iExciter/Zone and if iExciter has completed OTA transmission. It should be noted that the number-of-broadcasts-completed can be set to zero if there were no broadcast messages sent.

To create better-formatted content for a particular iBOC device, the ASP may request the capabilities of a particular device on the iBOC network. The iPPG maintains a subscriber profile database of registered subscribers and, in the preferred embodiment, may share this information with the ASP. It should be noted that, although a subscriber profile database is mentioned in conjunction with the iPPG, one skilled in the art can envision the ASP using other means (such as the Internet) to extract such profile information.

Thus, in summary, the iPPG is able to push data from various content provider centers and is also able to pull data from remote content providers. The content provider centers and remote content providers are able to communicate with the iPPG via a network (LAN, WAN, Internet, etc.). Based upon the request from the content provider centers, the data is then pushed via a network such as an IBOC network onto various end devices (clients).

It should be noted that although only one iPPG is described, one skilled in the art of networked communication can envision using multiple iPPGs, for distributed processing, wherein such gateways are controlled by one or more centralized gateways. Thus, one skilled in the art can envision using various combinations including, but not limited to, one iPPG and many transmitters, a set of networked iPPGs, and a master iPPG and a scaled down iPPG. Furthermore, although the iPPG, remote content providers, and content provider center are shown to be separate entities communicating over various networks, one skilled in the art can envision them as being implemented locally in one single entity.

As mentioned earlier, the Push download at the iPPG is carried out via protocols such as HTTP. It should, however, be noted that the data receiver does not perform any protocol mapping as the ASP uses standard API, which the end device is equipped with, or optionally, the end device equipment is pre-downloaded with non-standard API by using an original equipment manufacturer (OEM) provided serial interface and drivers. This can be done over IBOC. Furthermore, the ASP provides a selection of various fields (services and control categories) as provided by the iPPG. Additionally, if a mandatory element is not initialized, the iPPG performs default initialization.

FIG. 4 illustrates how incoming data is handled at the client (receiver's end—an IBOC-enabled mobile device 400). An antenna 401 located on the receiver first receives incoming data, and detection equipment 402 detects such data and optionally amplifies the signal. The received data is then deinterleaved via deinterleaver 405, demodulated via demodulator 406, decoded via a transport decoder 407 (such as a iDAB transport layer decoder), and further decoded via a data link layer decoder 408. If data is audio, it is forwarded to PAC decoder 419, and if it is meant for turbo broadcast layer, it is forwarded to 408. Audio signals are converted into audible sounds and are forwarded to the speaker 403. The detection equipment 402 uses a channel quality measurer 404 to calculate the quality associated with a tuned channel. It should be noted that the host processing unit 409 actively controls the above-described deinterleaver, demodulator, decoder, and turbo broadcast layer decoder. Lastly, the host processing unit 409 and associated memory process the decoded data before being presented to the end user device, via a display device 412 (with OEM I/O input 411).

A GPS system 413 is also included. Content pushed by iPPG have GPS coordinate information. The receiver application filters iPPG pushed content by reading GPS-413 periodically. Additionally, the receiver also has a battery save module 414 that, when activated, saves battery energy by deactivating the receiver when scheduled transmissions are not of interest to the receiver. A wakeup function 415 is provided for activating the receiver when scheduled transmissions of interest are taking place to the receiver. In addition, an uplink module 416 is also provided for uploading profile related information to the iPPG via an existing wireless network and also to initiate buy interaction.

Figure 5A:
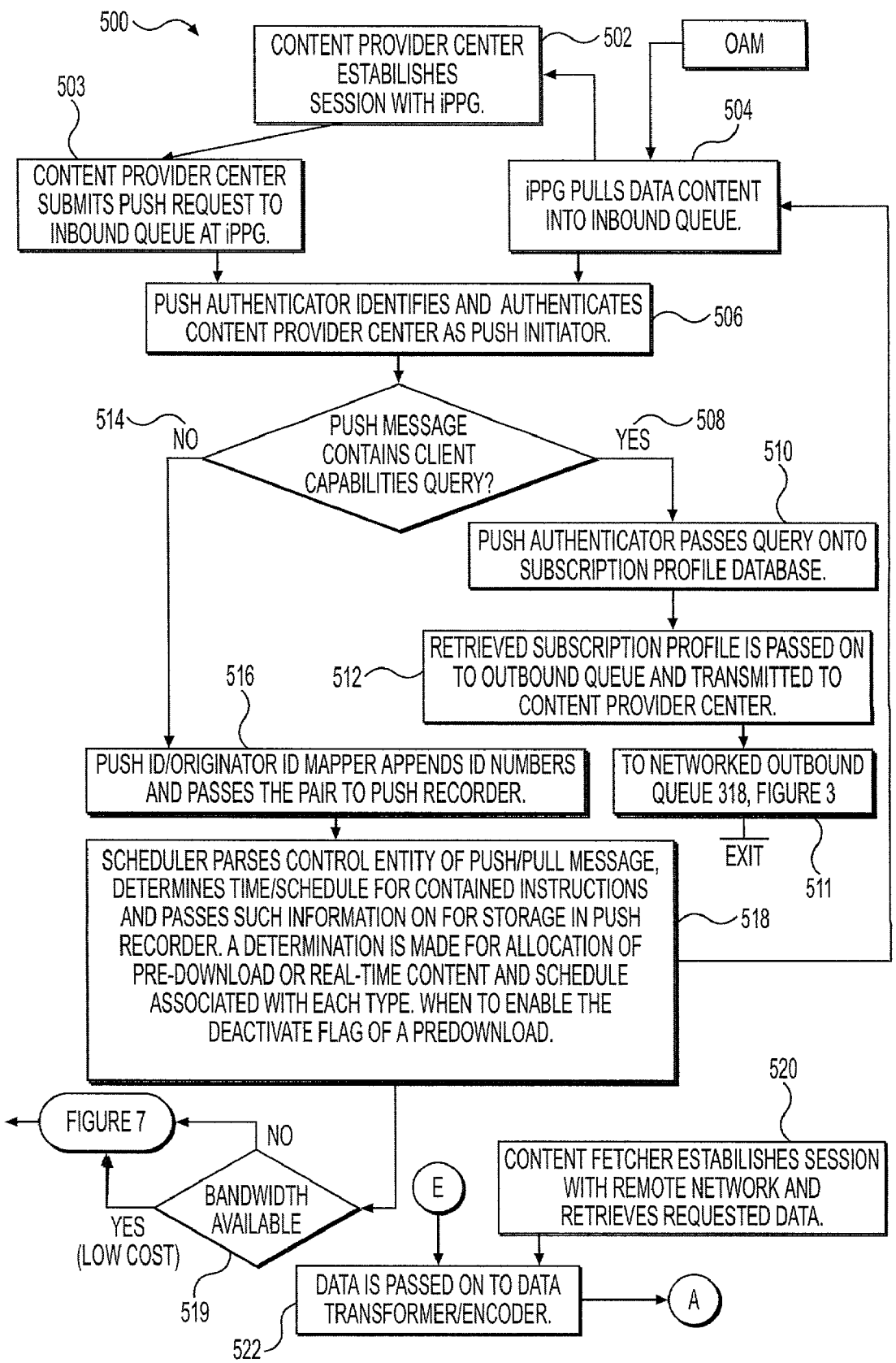
FIGS. 5a and 5b collectively illustrate the method associated with the iPPG.
Figure 5B:
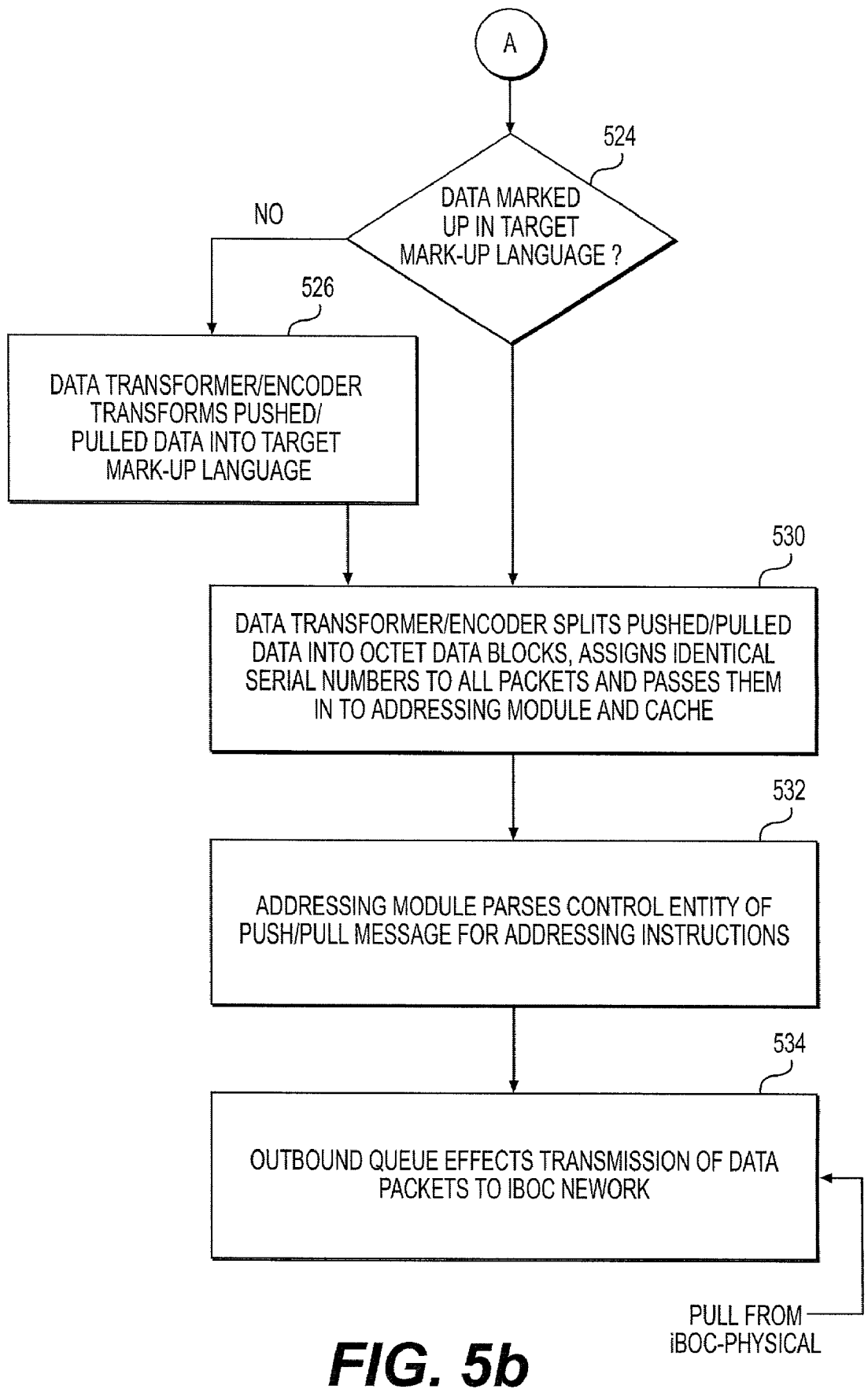

FIGS. 5a and 5b collectively illustrate the method 500 associated with the iPPG. At step 502, the content provider center contacts the iPPG via a communication link using well known protocols such as TCP/IP, PPP, etc., and establishes a request/response session, wherein the iPPG acts as a server and the content provider center as a client. Using a push/pull protocol the content provider center either, at step 503, submits a push request to the iPPG or, in step 504, pulls from the data content provider. The data is cached to the inbound queue of the iPPG. It is understood that the push/pull download protocol is only one option for transmitting push content to the iPPG. Push/Pull protocol is tunneled through existing protocols such as HTTP. The push message consists of the following three entities: control entity, content entity, and capability query entity.

The control entity is marked up in a mark up language such as Extensible Markup Language (XML) and contains delivery instructions, such as originating and destination address, message ID, priority indicator, message category, repetition rate, message time stamp, privacy indicator, status request, client capabilities query, or cancellation request for previously submitted content. It is understood that the preceding list of possible delivery instructions is non-exhaustive and should not be used to limit the scope of the present invention.

Furthermore, if the content provider requests for transparent transfer of data, then the iPPG is capable of supporting a fixed bandwidth with a defined QoS. During this reservation period, the iPPG simply acts as a transparent conduit. It is the responsibility of the content provider center to make use of the close protocol at the remote receiving wireless device.

The client capabilities are preloaded into the iPPG by the remote receiving wireless device's Original Equipment Manufacturers (OEMs). Content provider centers are able to query in a markup language format (such as XML) and request the capabilities of a particular device in the IBOC network. Such information is contained in a client database, which may also receive its subscriber profiles from mobile devices (with uplink capabilities) via a wireless datalink and inbound queue.

Following the establishment of a session and submission of a push or pull request at steps 502 through 504, the push authenticator identifies and authenticates at step 506, the content provider center as push initiator. Such authentication is achieved by means of session-level certification, by use of object-level certificates (i.e., encryption of the content on an End-to-End basis), HTTP authentication (e.g., user/password pairs or digest based authentication), or a combination of the preceding methods. Such authentication is achieved using various protocols (e.g., CHAP).

If such authentication is successful, and if the client capabilities query entity contains a request 508, push authenticator passes, at step 510, such query on to a client subscription profile database where subscriber profiles of registered users of mobile devices are stored. The requested subscription profiles are then, at step 512, retrieved from the client subscription database and submitted to the outbound queue (318 in FIG. 3) for transmission to the content provider center, which is subsequently able to provide better and more customized data according to the subscriber profile and the mobile device's (clients) capabilities. Thus, when content provider center wants to perform a push to client, it queries the iPPG for capabilities of the remote wireless device (such as classifications, e.g., class A, class B, class C, etc.). Class A is defined as the state of the art receiver (i.e., maximum resolution, memory, MIPS, uplink, GPS, doubletuner) and classes B, C, etc., are low end receivers with minimum display, etc.

If no client query was submitted 514, or after completion of step 512, push ID/originator ID of the respective content provider center are extracted 516, and this information is then passed on to the push recorder. Push recorder stores the ID pair of the message and all data relating to it, such as time of transmission to the IBOC network, repetition rate, and other relevant details for receiver to compose the message. Also originator ID and amount of bandwidth, number of transmissions, and grade of service are recorded for billing purposes.

Figure 7A:
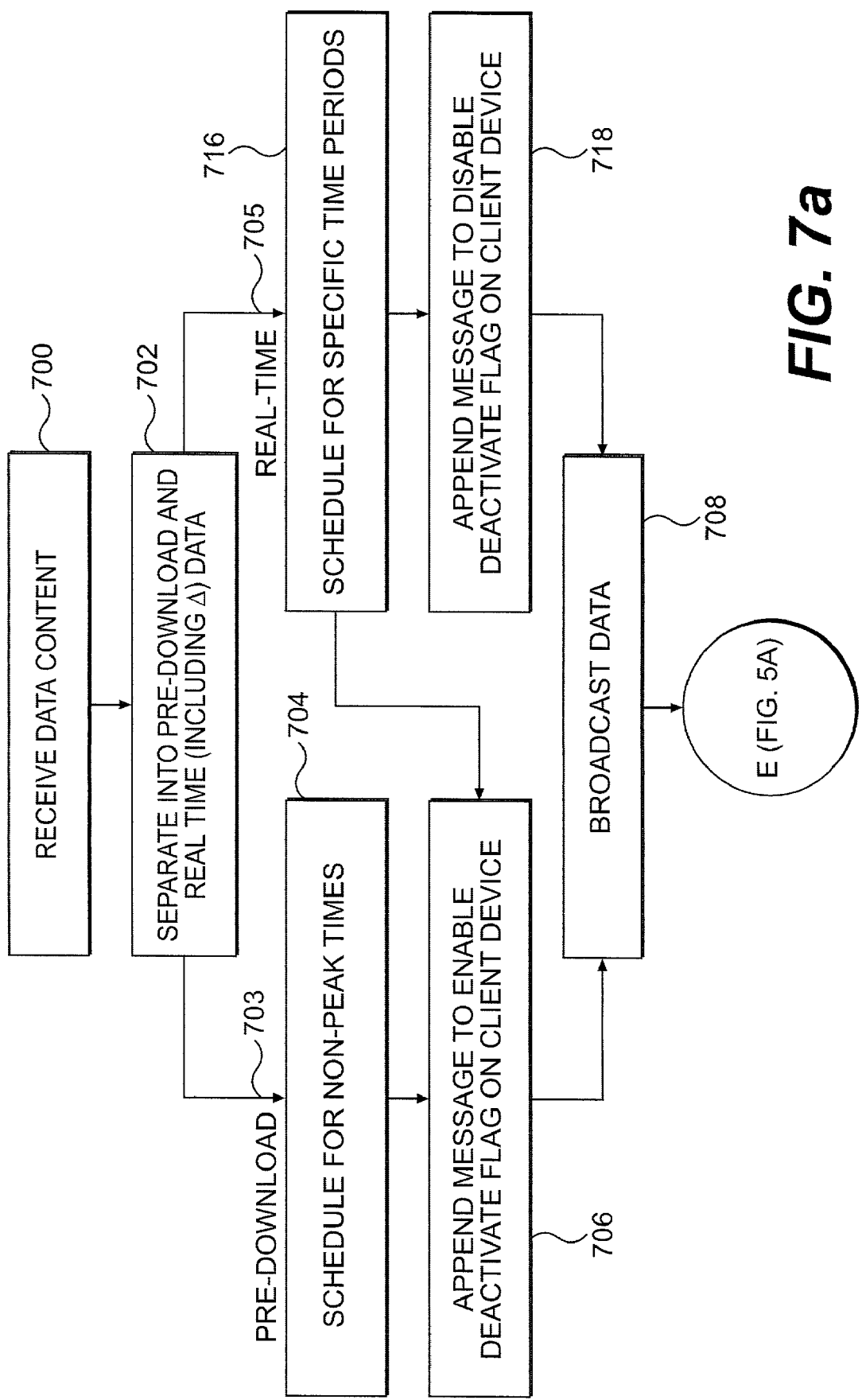
FIGS. 7a and 7b illustrate a general overview of the present invention.

Subsequently, at step 518, the scheduler parses the respective control entities of the incoming push messages, determines a time schedule for the broadcast rate, grade of requested service, time of broadcast commencement, time of pulling of content according to pull requests, and synchronizes such broadcast and pulling schedules, as well as available bandwidths via 519. If the bandwidth is not available, it initiates the flow shown in FIGS. 7a and 7b. Even if the bandwidth is available, a low cost flow may be provided as shown in FIGS. 7a and 7b.

As per the present invention, a determination is also made 518 (also see FIG. 7a-702) of how to break data content into pre-downloaded and real-time content and schedule appropriately for their download. Typically, pre-downloaded data content 703 will be downloaded to the client device during non-peak hours 704, before a scheduled real-time use of the pre-downloaded content. New real-time or changing data 705 (i.e., new content, updates, completion of incomplete pre-downloads 712/714, etc.), usually low-bandwidth text or voice, will be sent during actual use of the client device 716. Both types of data are broadcast 708 to the client for download with a client deactivate flag enabled by iPPG (data not immediately available for use) 706.

Figure 7B:
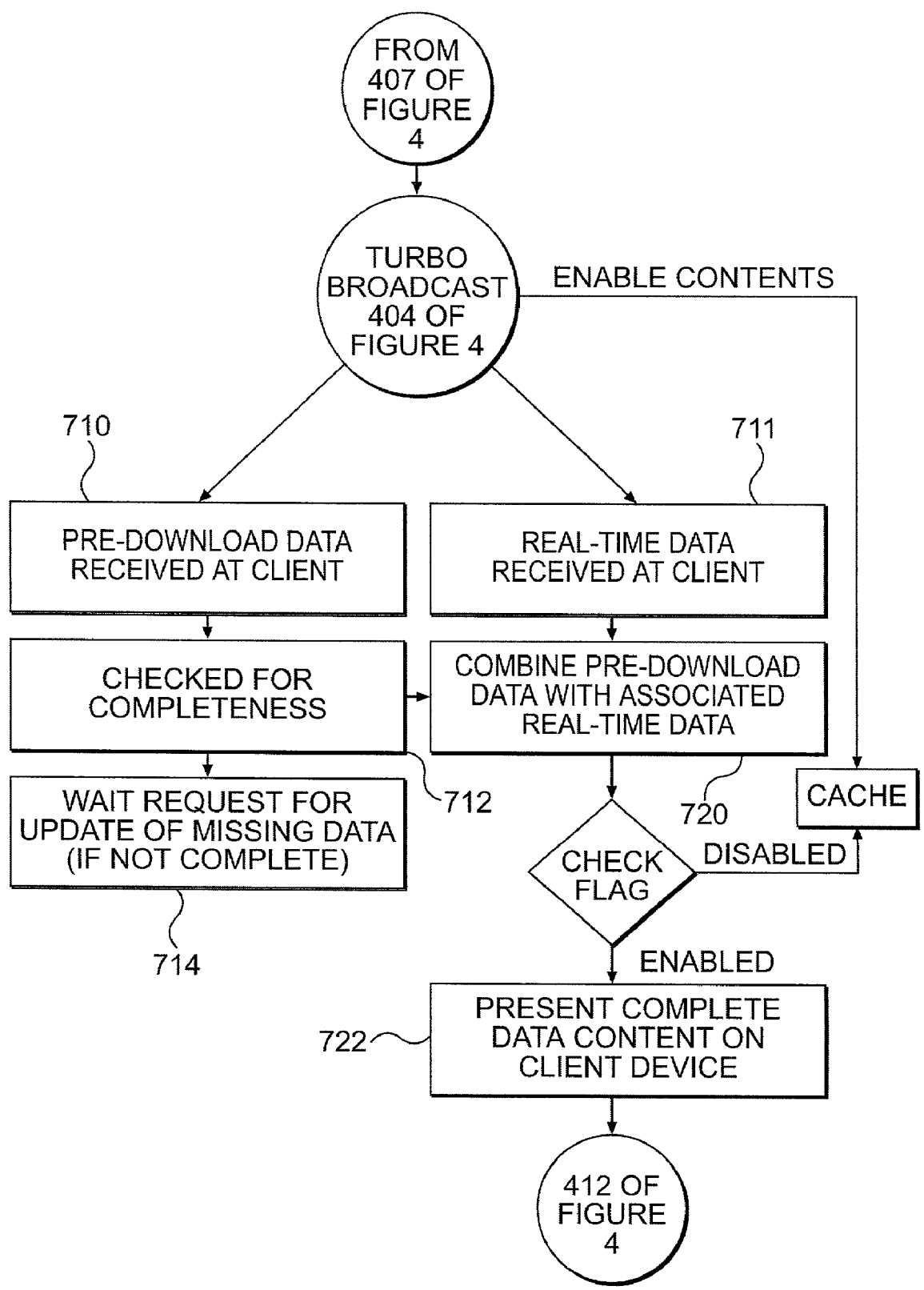

In FIG. 7b, receiver turbo broadcast layer parses for real-time data 711 and non-real-time data 710 for message completeness and validity. Next, an activation flag is then looked up in the valid message. In the event the enable flag is false, the contents are stored. These contents are now iPPG controlled. Therefore, they can be activated and deactivated as per need.

In one example, data content is broken down into background data (images/graphics) and foreground data (text). The background data is scheduled for pre-download to the client and is stored therewith before it is needed 710. At a later time, during use of the client device, the appropriate real-time data is combined (e.g., overlayed) with the background data 720 to complete the download of the original content to the end user device. At a scheduled time, the matched (combined) data is enabled by a broadcast message with an appropriate client flag set for use 718 (e.g., displayed).

In the preferred embodiment, the real-time push uses ASP simplex communication with the client (via an intermediary iPPG). Non-real-time is a pre-download where the deactivate flag is on with the condition that the receiver is always on.

According to the determined time schedule, and in the case of a pull request submitted at step 502, the content fetcher, at step 520, establishes a session with appropriate server on remote network area and retrieves the requested data files. Content provider may submit contents to be pushed at step 503. Step 506 is used for authentication and registration of the content provider. At step 508, contents can be pushed real-time (if bandwidth is available) or it can be scheduled for a pre-download later. Even if bandwidth is available pre-download is recommended (may be at a lower cost). If no pull request has been submitted at step 502 or after completion of step 520, the pushed/pulled data is passed on to data transformer/encoder at step 522. If the data submitted to data transformer/encoder needs to be transformed into a suitable mark-up language 524 for consumer device(s), the data transformer/encoder effects such data transformation by the use of translation software in step 526. Then, at step 530, TBL-SSAL splits the data into multiple octet data blocks, assigns identical serial numbers to all those packets, and passes them on to the cache and addressing module. In step 532, the addressing module parses the control entity of the push/pull message for addressing instructions.

Additionally, in step 530, the TBL-iMAC is invoked which performs functions like segmentation of TBL-SSAL, sequence numbers insert, payload FEC generate, CRC of iMAC, target address append and setting of broadcast change notification flags. It then waits for IBOC physical layer indication message, i.e., bits are given to the IBOC layer upon demand by the IBOC layer. Then, at step 534, outbound queue effects transmission of the data packets to the various transmitters in the IBOC network from where it is transmitted to mobile device(s) that listen to IBOC channels.

TBL-SSAL at iPPG, at step 524, performs service specific adaptation function such as rearranging packets to maintain QoS grade which include calculation of jitter, delay, repeat, reorder of packets, system related messages, service indicators, station URI, station logo, promotion tags, etc. TBL-SSAL at the receiver waits for an alert from iPPG to pick up from the pre-download queue.

Now, a more detailed description of the content scheduling is given. In broadcasting, prime time is the most appealing time slot for broadcasters and advertisers. But, due to the limited bandwidth, every over the air request at prime time cannot be handled. In a non real-time scheduling scenario, the iPPG handles this transmission of contents as follows. The iPPG transmits the content in advance with receiver display Deactivate Flag enabled (data content not activated). Then at prime time, the Deactivate Flag is disabled (content available to client device). If the scheduler allows prime time over the air transmission, then the transmission is repeated. This allows turned-off receivers to get the information. However, this re-transmission during prime time is not guaranteed.

In an extended embodiment, bulk download such as e-newspaper, e-books, software upgrades, etc., are performed during non-traffic hours such as midnight. Software downloads/upgrades are accomplished via an uplink. Should a particular receiver fail to compose the download, the receiver sends an uplink request regarding missing records. Additionally, in this embodiment, the iPPG gathers statistics to decide if there is a need to rebroadcast some segments of the transmission or to individually send the missing records to each receiver. IPPG can also perform a delete of the pre-download before it becomes active for use.

In yet another embodiment, the iPPG allows other programs, such as bulletin boards, to kick off real-time auto download. For example, using a protocol such as a proprietary (e.g., iBiquity™) file transfer protocol (iFTP), the iPPG polls information sites such as weather, traffic, stocks, games at pre-defined time periods and broadcasts any extracted information to the end devices.

Scheduling of messages depend on a variety of factors including the priority of messages, i.e., premium service first, followed by bit rate, latency grades, best effort, etc. Some of the other dimensions of scheduling include:

Time at which a message should commence over the air transmission.

Time at which a message should cease over the air transmission.

Rate at which over the air transmission of the message should be repeated.

Pre-download with deactivate flag turned on, and at scheduled time, deactivate flag turned off.

In yet another embodiment, schedule messages are generated indicating the intended schedule of transmissions. It should be noted that such schedule messages are helpful in minimizing battery in the iDR, because it allows the iDR to ignore transmissions of messages the subscriber is not interested in. In an additional embodiment, a specific channel for broadcasting the content is selected for over the air transmission.

Additionally, the iPPG is able to copy selective, random or all pushed and pulled content into a separate buffer called the passive queue. Thus, when all contents are served from the active queue, the scheduler transmits from the passive queue. Furthermore, over the air transmission packets are tagged identifying that these contents are from the passive queue. In the preferred embodiment, the receiver also maintains its own passive queue. The receiver may miss some packets transmitted and therefore cannot compose the contents. Thus, the receiver, when composing messages, ensures completeness by retrieving packets from its own passive queue (assuming transmission of passive queue at iPPG has occurred), collecting any missing packets, combining the two and reassembling to have a complete download. The system further includes a pseudo algorithm for bandwidth management called fair queuing. The application kernel looks at the appropriate header bits to determine advertisers requested grade of service (i.e., basic, prime, preferred, etc.). It then routes (or pre-loads) the information to one of the fair queues (FQ). Fair queuing is used to prioritize flows per requested grade of service and, at the same time, keeps resource starvation at its minimum. It should be noted that if an FQ flow does not use its assigned bandwidth, other flows are able to use it. Furthermore, each FQ has sub-queues and packets are scheduled so that each flow receives a constant fraction of the IBOC link bandwidth (especially during prime time schedule).

Each iPPG is able to serve multiple ports simultaneously. In this embodiment, the extra traffic is routed or negotiated with third party servers. Furthermore, as previously described, fixed/deterministic contents such as images, logos, etc., are downloaded during pre-download times. Then, the ASP transmits updated messages as per demand, which are later composed with the pre-downloaded content.

It should be noted that the iPPG is able to communicate with any well-known access networks via protocols such as PPP, TCP/IP, Frame Relay, Enhanced General Packet Radio Service (EGPRS), Sirius®, WAP, MediaPlex®, WML, XML, BlueKite® or other known or future protocols.

Furthermore, in an extended embodiment wherein the radio transmitter stations (iExciters) are networked, the iPPG routes the messages to the appropriate iExciter for extended footprint. The iPPG determines the geographical scope of each message and communicates with the respective iExciters (or iPPGs for national and local footprint, provided the iPPGs are networked). The iPPG further determines the time at which a message should cease being transmitted over the air and subsequently instructs each iExciter to cease over the air transmission.

It should further be noted that local transmitters are able to merge their available data bandwidth so that each stations (which has similar coverage) does not need to transmit the same information. Instead, unused bandwidth is used for other data contents. Additionally, if local networked stations schedule data broadcast at a pre-determined time, then station coverage regions that are noise affected with one contour pick up and compare the content from another station transmission. This scheme helps assure that the receiver receives information that is healthy (because it can compare same information transmitted by another transmission). The use of this scheme requires synchronized scheduling.

Figure 8A:
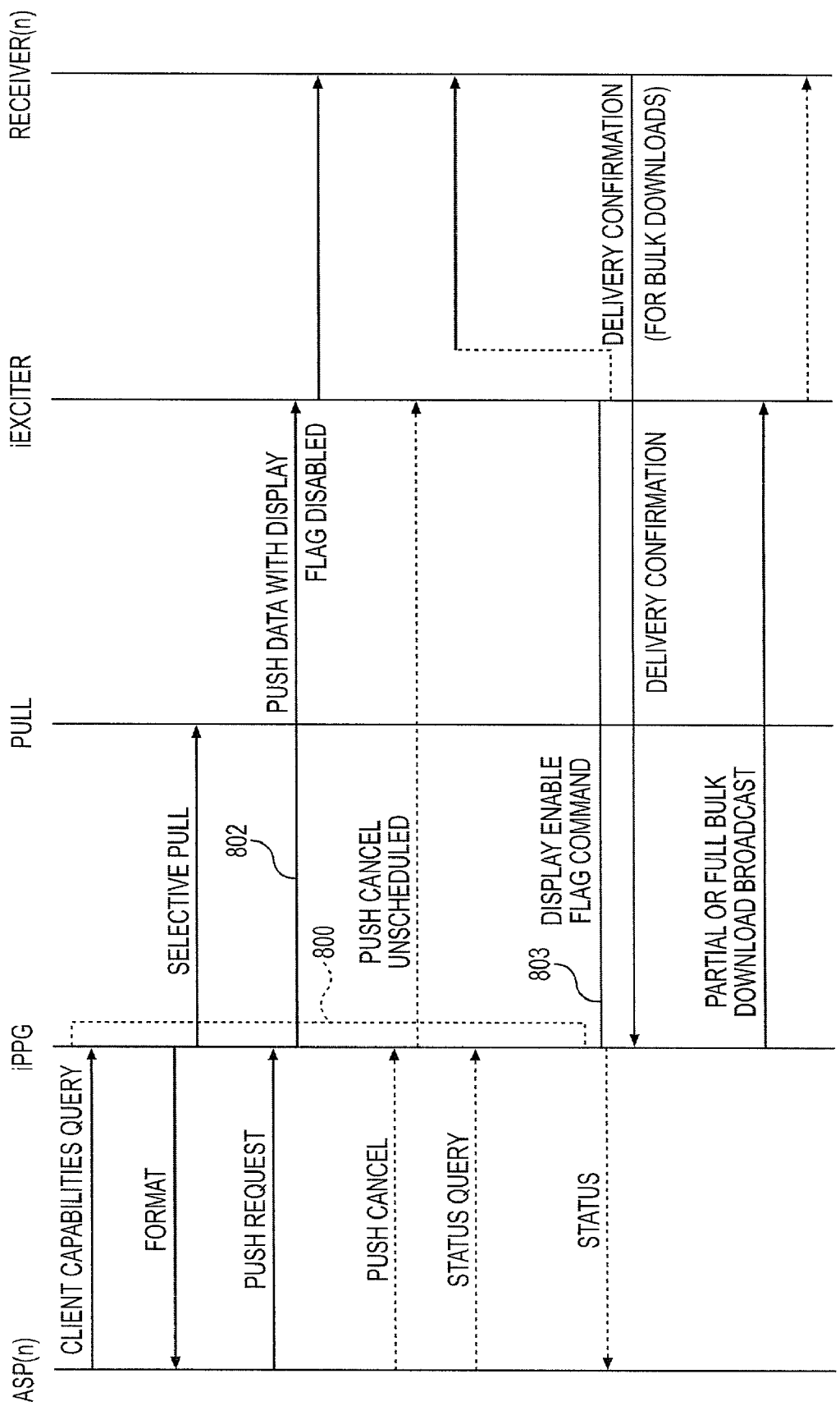
FIGS. 8a and 8b collectively illustrate a time line of execution of the present invention.
Figure 8B:
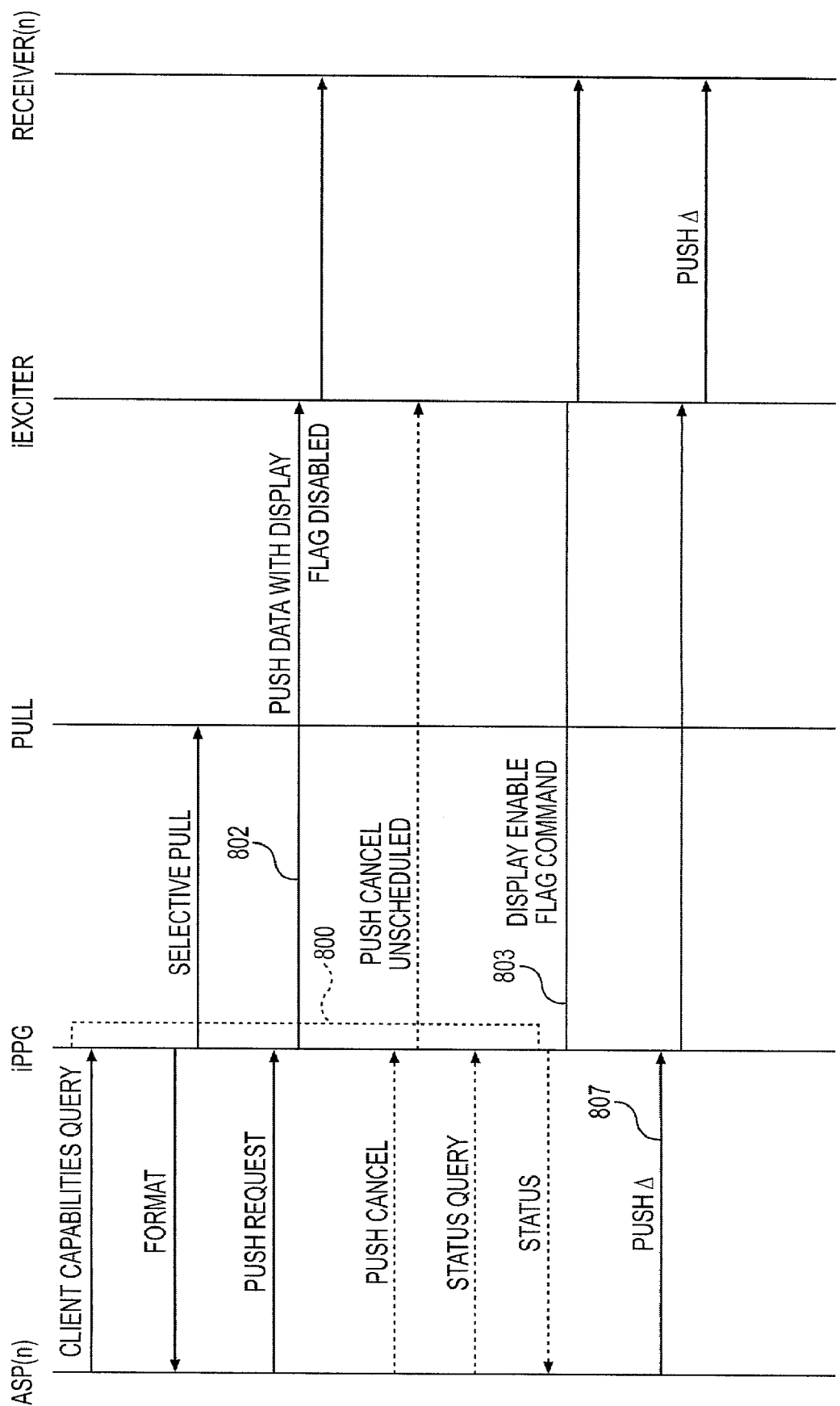

FIGS. 8a and 8b illustrate a present invention time line of execution (chronologically from top to bottom). FIG. 8a illustrates the pre-download steps and 8b the real-time download steps. The steps associated with element 800 represent the effort to select pre-download data content to be pushed to a client device with display Flag disabled. At step 802, pre-download data is enabled to one or more client devices. Pre-download Push is typically performed during non-peak hours, a client deactivate flag is also broadcast to prevent the downloaded data from being immediately accessible, with the assumption that client device is always on.

A "Push cancel unscheduled" message from iPPG to iExciter is used to delete pre-download contents, which have not been transmitted over-the-air.

If the contents are transmitted over-the-air with deactivate flag enabled, then the pre-downloaded contents can be deleted by:
  a) explicitly sending a command by iPPG to delete the cached data in the receiver, or
  b) the iPPG never sends the enable deactivate flag, or
  c) time-to-live is specified in the pre-download. This suggests that if enable flag is not received within a certain time; self-destruct at receiver is triggered when time-to-live timer is expired.

During the real-time download (FIG. 8b), a selective push/pull of real-time data is generated 800. As with the pre-download, the deactivate display flag is enabled (data not immediately available) 802. Associated pre-downloaded data is combined with the associated real-time data at the client and, upon reaching a predetermined scheduled time period, is activated for use 803. This can either be triggered by iPPG or receiver can use its internal clock-GPS if iPPG has given that option. If additional data or change of data 807 is available for broadcast to the client, the data is broadcast to the client and the data then reactivated for presentation (e.g., displayed). Although only one series of status queries and delivery confirmation steps are shown, these steps may be repeated throughout data downloads. Receivers configured for fee based download packages or specific content (e.g., news, sports, traffic, stock quotes packages or specific songs, respectively), are the only recipients of these services and other receivers don't get this information. Therefore clients configured for subscription based are charged accordingly.

The present invention includes a computer program code based product, which is a storage medium having program code stored therein, which can be used to instruct a computer to perform any of the methods associated with the present invention. The computer storage medium includes any of, but not limited to, the following: CD-ROM, DVD, magnetic tape, optical disc, hard drive, floppy disk, ferroelectric memory, flash memory, ferromagnetic memory, optical storage, charge coupled devices, magnetic or optical cards, smart cards, EEPROM, EPROM, RAM, ROM, DRAM, SRAM, SDRAM or any other appropriate static or dynamic memory, or data storage devices.

Implemented in computer program code based products are software modules for: receiving a push request from a content provider center, authenticating the content provider center as the originator of the push request, parsing the push request for push, pull, broadcast times, and addressing directives, fetching data content to be pulled over a network based upon the parsed directives, encoding the fetched data, and transmitting the encoded data based upon the parsed broadcast times and the addressing directives. In addition, according to scheduling decisions, pre-downloading of data content to the client device is performed during non-peak hours before a scheduled real-time use of the pre-downloaded content. Real-time data is sent during peak times and actual use is enabled according to a scheduled period. (The real-time push uses ASP simplex communication with the client (via an intermediary iPPG). Non-real-time is a pre-download where the deactivate flag is on with the condition that the receiver is always on.). The above enhancements for icons and its described functional elements are implemented in various computing environments. For example, the present invention may be implemented across a multi-nodal system (e.g., LAN) or networking system (e.g., Internet, WWW, wireless web). All programming and data related thereto are stored in computer memory, static or dynamic, and may be retrieved by the user in any of: conventional computer storage, display (i.e., CRT) and/or hardcopy (i.e., printed) formats. The programming of the present invention may be implemented by one of skill in the art of network communications, mark-up language and protocol programming.

A system and method has been shown in the above embodiments for the effective implementation of system and method for providing a push of background data. While various preferred embodiments have been shown and described, it will be understood that there is no intent to limit the invention by such disclosure, but rather, it is intended to cover all modifications and alternate constructions falling within the spirit and scope of the invention, as defined in the appended claims. For example, the present invention should not be limited by software/program, computing environment, specific computing hardware, choice of communication protocols, number of transmitters, number of clients, and number of Push/Pull gateways used. Client devices include consumer electronics devices such as home radio, or refrigerator with iDAB™ (iBiquity system) monitor, Walkman™, etc.

I claim:

1. A system for dynamic scheduling of broadcast digital data content to client devices of users, said digital data content available from one or more sources, and said scheduling based on type of data and activity of said system, said system comprising:

a digital radio broadcast system comprising one or more gateways, said one or more gateways receiving one or more selections of digital data content and processing said digital data content for digital radio broadcast transmission, said one or more gateways comprising:

a scheduler for receiving said data content, said scheduler separating said received data content into a first data type and a second data type;

said scheduler scheduling data content of said first data type to be broadcast via digital radio broadcast transmission to said client devices during selective first broadcast periods;

said scheduler scheduling data content of said second data type to be broadcast via digital radio broadcast transmission to said client devices during selective second broadcast periods;

said data content scheduled for use during a scheduled time period after a recombination of said broadcasted data content of said first data type and of said second data type at said client devices;

said gateway appending a deactivate flag to data content of said first data type, and processing said data content of the first data type for digital radio broadcast transmission to the client devices, wherein said deactivate flag instructs said client devices to store without rendering said data content of the first data type;

said gateway appending a deactivate flag to data content of said second data type, and processing said data content of the second data type for digital radio broadcast transmission to the client devices, wherein said deactivate flag instructs said client devices to store without rendering said data content of the second data type;

said gateway processing a disable deactivate flag for digital radio broadcast transmission to the client devices, wherein said disable deactivate flag instructs said client devices to activate the data content of the first data type and the data content of the second data type and render the data content of the first data type and the second data type in synchronization with real-time rendering of a digital radio broadcast transmission;

said gateway processing said data content of the first data type and said data content of the second data type for digital radio broadcast transmission to client devices without receiving any communication from a user of a client device requesting said data content.

2. A system for dynamic scheduling of broadcast digital data content to client devices, as per claim 1, wherein said first data-type requires a high bandwidth and said second data type requires a relatively lower bandwidth.

3. A system for dynamic scheduling of broadcast digital data content to client devices, as per claim 1, wherein said scheduler provides a time-to-live value that specifies a time interval that said client devices are to wait for the reception of said disable deactivate flag, and upon expiration of said time interval, said client devices deleting at least a part of said recombined data.

4. A system for dynamic scheduling of broadcast digital data content to client devices, as per claim 1, wherein said first data-type comprises any of, or a combination of: images, fixed display data, graphics, song compilations, digital data purchases, maps, e-books, or newspapers.

5. A system for dynamic scheduling of broadcast digital data content to client devices, as per claim 1, wherein said second data type comprises any of, or a combination of: text or audio to accompany said images, fixed display data, graphics, new songs, traffic conditions, and data to complete first data type downloads.

6. A system for dynamic scheduling of broadcast digital data content to client devices, as per claim 1, wherein said first broadcast period comprises low broadcast and/or client usage periods.

7. A system for dynamic scheduling of broadcast digital data content to client devices, as per claim 1, wherein said second broadcast period comprises high broadcast and/or client usage periods.

8. A system for dynamic scheduling of broadcast digital data content to client devices, as per claim 1, wherein said first broadcast period comprises a period of relative low activity of said broadcasts or client usage and said second broadcast period comprises relatively high activity of said broadcasts or client usage.

9. A system for dynamic scheduling of broadcast digital data content to client devices, as per claim 1, wherein first data-type is broadcast before said second data type.

10. A system for dynamic scheduling of broadcast digital data content to client devices, as per claim 1, wherein said client devices comprise a digital consumer electronics radio.

11. A system for dynamic scheduling of broadcast digital data content to client devices, as per claim 1, wherein said client devices comprise any of a: handheld computer device, wireless telephone, radio telephone, portable computer, or consumer electronics.

12. A system for dynamic scheduling of broadcast digital data content to client devices, as per claim 1, wherein said data content sources include any of, or a combination of: electronic advertisers, the Internet, the world wide web, ISPs, or connected digital libraries.

13. The system of claim 1, wherein the second data type comprises traffic update information.

14. The system of claim 1, wherein the gateway processes identifier information of a particular client device for digital radio broadcast transmission for targeting content to the particular client device.

15. A method for dynamic scheduling of broadcast digital data content to client devices of users, said method comprising:
   receiving data content from content providers with a processing system;
   separating said data content into a first data type and a second data type with the processing system;
   scheduling data content of said first data type to be broadcast via digital radio broadcast transmission during a first time period with the processing system;
   appending a deactivate flag to said data content of the first data type with the processing system, wherein said deactivate flag instructs said client devices to store without rendering said content of the first data type;
   scheduling data content of said second data type to be broadcast via digital radio broadcast transmission during a second time period;
   appending a deactivate flag to said data content of the second data type, wherein said deactivate flag instructs said client devices to store without rendering said content of the second data type;
   broadcasting via digital radio broadcast transmission to one or more client devices said data content of the first and second data types during their respective time periods for recombination at said client devices, wherein said data content is broadcast to said one or more client devices without receiving a communication from a user of a client device requesting said data content; and
   broadcasting via digital radio broadcast transmission a disable deactivate flag, wherein said disable deactivate flag instructs said client devices to activate the data content of the first data type and the data content of the second data type and render the data content of the first data type and the data content of the second data type in synchronization with real-time rendering of a digital radio broadcast transmission.

16. A method for dynamic scheduling of broadcast digital data content to client devices, as per claim 15, wherein said method further comprises the step of sending a cancellation message to said one or more client devices to delete at least a part of said recombined data.

17. A method for dynamic scheduling of broadcast digital data content to client devices, as per claim 15, wherein said first data type requires a high bandwidth and said second data type requires a relatively lower bandwidth.

18. A method for dynamic scheduling of broadcast digital data content to client devices, as per claim 15, wherein said first data type comprises any of, or a combination of: images, fixed display data, graphics, song compilations, digital data purchases, maps, e-books, or newspapers.

19. A method for dynamic scheduling of broadcast digital data content to client devices, as per claim 18, wherein said second data type comprises any of, or a combination of: text or audio to accompany said images, fixed display data, graphics, new songs, traffic conditions, and data to complete first data type downloads.

20. A method for dynamic scheduling of broadcast digital data content to client devices, as per claim 15, wherein said first broadcast period comprises low broadcast and/or client usage periods.

21. A method for dynamic scheduling of broadcast digital data content to client devices, as per claim 15, wherein said second broadcast period comprises high broadcast and/or client usage periods.

22. A method for dynamic scheduling of broadcast digital data content to client devices, as per claim 15, wherein said first broadcast period comprises a period of relative low activity of said broadcasts or client usage and said second broadcast period comprises relatively high activity of said broadcasts or client usage.

23. A method for dynamic scheduling of broadcast digital data content to client devices, as per claim 15, wherein first data type is broadcast before said second data type.

24. A method for dynamic scheduling of broadcast digital data content to client devices, as per claim 15, wherein said one or more client devices comprise a digital consumer electronics radio.

25. A method for dynamic scheduling of broadcast digital data content to client devices, as per claim 15, wherein said one or more client devices comprise any of a: handheld computer device, wireless telephone, radio telephone, portable computer, or home consumer electronics.

26. A method for dynamic scheduling of broadcast digital data content to client devices, as per claim 15, wherein said data content sources include any of, or a combination of: advertisers, the Internet, the world wide web, ISPs, or connected digital libraries.

27. The method of claim 15, wherein the second data type comprises traffic update information.

28. The method of claim 15, comprising processing identifier information of a particular client device for digital radio broadcast transmission for targeting content to the particular client device.

29. A method for dynamic processing of broadcast digital data content, said method comprising:
   receiving first data content with a deactivate flag appended thereto at a client device of a user via digital radio broadcast transmission;

in response to said deactivate flag, storing in local storage without rendering said first data content;

receiving second data content with a deactivate flag appended thereto at the client device of the user via digital radio broadcast transmission, said second data content comprising any of, or a combination of: missing data from said first data content, new data associated with said first data content, new data unrelated to said first data content, and changes in data previously received;

in response to said deactivate flag, storing in local storage without rendering said second data content;

receiving via digital radio broadcast transmission a disable deactivate flag and in response thereto, activating said received first data content and said received second data content during a specific scheduled time period and rendering said data content of the first data type and said data content of the second data type in synchronization with the real-time rendering of a digital radio broadcast transmission, said first data content and second data content being received at said client device without any communication from the user requesting said first data content or said second data content.

30. A method for dynamic processing of broadcast digital data content, as per claim 29, wherein said first data content requires a high bandwidth and said second data content requires a relatively lower bandwidth.

31. A method for dynamic processing of broadcast digital data content, as per claim 29, wherein said first data content comprises any of, or a combination of: images, fixed display data, graphics, song compilations, digital data purchases, or maps.

32. A method for dynamic processing of broadcast digital data content, as per claim 29, wherein said second data content comprises any of, or a combination of: text or audio to accompany said images, fixed display data, graphics, new songs, traffic conditions, and data to complete said first data content.

33. A method for dynamic processing of broadcast digital data content, as per claim 29, wherein said first data content is received during low broadcast and/or client usage periods.

34. A method for dynamic processing of broadcast digital data content, as per claim 29, wherein said second data content is received during high broadcast and/or client usage periods.

35. A method for dynamic processing of broadcast digital data content, as per claim 29, wherein said first data content is received during a period of relative low activity of said broadcasts or client usage and said second data content is received during relatively high activity of said broadcasts or client usage.

36. A method for dynamic processing of broadcast digital data content, as per claim 29, wherein first data content is received before said second data content.

37. A method for dynamic processing of broadcast digital data content, as per claim 29, wherein said client is a digital consumer electronics radio.

38. A method for dynamic processing of broadcast digital data content, as per claim 29, wherein said client is any of a: handheld computer device, wireless telephone, radio telephone, portable computer, or consumer electronics.

39. A method for dynamic processing of broadcast digital data content, as per claim 29, wherein said data content originates from any of, or a combination of: advertisers, the Internet, the world wide web, ISPs, or connected digital libraries.

40. The method of claim 29, wherein the second data content comprises traffic update information.

41. The method of claim 29, comprising receiving identifier information of a particular client device via digital radio broadcast transmission along with content targeted to the particular client device.

42. A method for dynamic scheduling of broadcast digital data content to client devices of users, said method comprising:

receiving data content from content providers with a processing system;

separating said data content into a first data type and a second data type with the processing system;

scheduling data content of said first data type to be broadcast via digital radio broadcast transmission during a first time period with the processing system;

appending a deactivate flag to said data content of the first data type with the processing system, wherein said deactivate flag instructs said client devices to store without rendering said data content of the first data type;

scheduling data content of said second data type to be broadcast via digital radio broadcast transmission during a second time period;

appending a deactivate flag to said data content of the second data type, wherein said deactivate flag instructs said client devices to store without rendering said data content of the second data type;

broadcasting via digital radio broadcast transmission to one or more client devices said data content of the first and second data types during their respective time periods for recombination at said one or more client devices; and broadcasting via digital radio broadcast transmission an activation message to said one or more client devices to activate the data content of the first data type and the data content of the second data type in synchronization with real-time rendering of a digital radio broadcast transmission during a scheduled time period, wherein all communications processed at said one or more client devices relating to said data content are push-type communications received by said one or more client devices via digital radio broadcast transmission.

43. The method of claim 42, wherein the second data type comprises traffic update information.

44. The method of claim 42, comprising processing identifier information of a particular client device for digital radio broadcast transmission for targeting content to the particular client device.

45. A system for dynamic processing of broadcast digital data content, comprising:

a processing unit; and a memory, wherein the memory comprises processing instructions that cause the processing unit to execute steps of:

receiving data content from content providers;

separating said data content into a first data type and a second data type;

scheduling data content of said first data type to be broadcast via digital radio broadcast transmission during a first time period;

appending a deactivate flag to said data content of the first data type, wherein said deactivate flag instructs said client devices to store without rendering said data content of the first data type;

scheduling data content of said second data type to be broadcast via digital radio broadcast transmission during a second time period;

appending a deactivate flag to said data content of the second data type, wherein said deactivate flag instructs said client devices to store without rendering said data content of the second data type;

communicating said data content of the first and second data types to a digital radio broadcast system for digital radio broadcast to one or more client devices of users during the respective time periods for recombination of said first and second data types at said one or more client devices; and communicating information to the digital radio broadcast system to cause the digital radio broadcast system to send an activation message to said one or more client devices to activate the data content of the first data type and data content of the second data type and render the data content of the first data type and the data content of the second data type in synchronization with real-time rendering of a digital radio broadcast transmission during a scheduled time period.

46. The system of claim 45, wherein the second data type comprises traffic update information.

47. The system of claim 45, wherein the processing unit processes identifier information of a particular client device for digital radio broadcast transmission for targeting content to the particular client device.

48. A system for dynamic processing of broadcast digital data content, comprising:

a processing unit; and a memory, wherein the memory comprises processing instructions that cause the processing unit to execute steps of:

receiving first data content with a deactivate flag appended thereto at a client device of a user via digital radio broadcast transmission;

in response to said deactivate flag, storing in local storage without rendering said first data content;

receiving second data content with a deactivate flag appended thereto, said second data content comprising any of, or a combination of: missing data from said first data content, new data associated with said first data content, new data unrelated to said first data content, and changes in data previously received;

in response to said deactivate flag, storing in local storage without rendering said second data content;

receiving via digital radio broadcast transmission a disable deactivate flag, and in response thereto:

activating said received first data content and said received second data content and rendering said received first and second data content in synchronization with real-time rendering of a digital radio broadcast transmission during a specific scheduled time period, said first data content and second data content being received at said client device without any communication from the user requesting said first data content or said second data content.

49. The system of claim 48, wherein the second data content comprises traffic update information.

50. The system of claim 48, wherein the processing unit receives identifier information of a particular client device via digital radio broadcast transmission along with content targeted to the particular client device.

51. A computer readable storage medium having embodied therein computer instructions for dynamic processing of broadcast digital data content, said instructions for causing a processing unit to execute steps of:

receiving first data content with a deactivate flag appended thereto at a client device of a user via digital radio broadcast transmission;

in response to said deactivate flag, storing in local storage without rendering said first data content;

receiving second data content with a deactivate flag appended thereto at the client device of the user via digital radio broadcast transmission, said second data content comprising any of, or a combination of: missing data from said first data content, new data associated with said first data content, new data unrelated to said first data content, changes in data previously received;

in response to said deactivate flag, storing in local storage without rendering said second data content;

receiving via digital radio broadcast transmission a disable deactivate flag, and in response thereto:

activating said received first data content and said received second data content and rendering said received first and second data content in synchronization with real-time rendering of a digital radio broadcast transmission during a specific scheduled time period, said first data content and second data content being received at said client device without any communication from a user requesting said first data content or second data content.

52. The computer readable storage medium of claim 51, wherein the second data content comprises traffic update information.

53. The computer readable storage medium of claim 51, comprising computer instructions for causing the processing unit to receive identifier information of a particular client device via digital radio broadcast transmission along with content targeted to the particular client device.

54. A system for dynamic scheduling of broadcast digital data content to client devices of users, said digital data content available from one or more sources, and said scheduling based on type of data and activity of said system, said system comprising:

a digital radio broadcast system comprising one or more gateways, said one or more gateways receiving one or more selections of digital data content and processing said digital data content for digital radio broadcast transmission, said one or more gateways comprising:

a scheduler for receiving said data content, said scheduler separating said received data content into a first data type and a second data type;

said scheduler scheduling data content of said first data type to be broadcast via digital radio broadcast transmission to said client devices during selective first broadcast periods;

said scheduler scheduling data content of said second data type to be broadcast via digital radio broadcast transmission to said client devices during selective second broadcast periods;

said gateway appending a deactivate flag to data content of said first data type, and processing said data content of the first data type for digital radio broadcast transmission to the client devices, wherein said deactivate flag instructs said client devices to store without rendering said data content of the first data type;

said gateway processing said data content of the second data type for digital radio broadcast transmission to the client devices and for rendering the data content of the second data type in real-time at the client devices;

said gateway processing a disable deactivate flag for digital radio broadcast transmission to the client devices, wherein said disable deactivate flag instructs said client devices to activate the data content of the first data type and render the data content of the first data type in synchronization with real-time rendering of the data content of the second data type;

said gateway processing said data content of the first data type and said data content of the second data type for digital radio broadcast transmission to client devices without receiving any communication from a user of a client device requesting said data content.

55. The computer readable storage medium of claim 54, wherein the second data type comprises traffic update information.

56. The computer readable storage medium of claim 54, comprising computer instructions for causing the processing unit to process identifier information of a particular client device for digital radio broadcast transmission for targeting content to the particular client device.

* * * * *